(12) United States Patent
Aktas et al.

(10) Patent No.: US 12,077,067 B2
(45) Date of Patent: Sep. 3, 2024

(54) MANUAL AND POWERED ACTUATION OF TRACK ASSEMBLY

(71) Applicant: Ford Global Technologies, LLC, Dearborn, MI (US)

(72) Inventors: Macit Aktas, Windsor (CA); Johnathan Andrew Line, Northville, MI (US); Joseph Michael Kish, Canton, MI (US); Spencer Robert Hoernke, Dundas (CA); Jung Jeon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/477,099

(22) Filed: Sep. 28, 2023

(65) Prior Publication Data

US 2024/0034197 A1 Feb. 1, 2024

Related U.S. Application Data

(62) Division of application No. 17/850,033, filed on Jun. 27, 2022, now Pat. No. 11,807,137, which is a division of application No. 17/174,396, filed on Feb. 12, 2021, now Pat. No. 11,407,332.

(51) Int. Cl.
*B60N 2/12* (2006.01)
*B60N 2/02* (2006.01)

(52) U.S. Cl.
CPC ............. *B60N 2/0224* (2013.01); *B60N 2/12* (2013.01); *B60N 2/0256* (2023.08)

(58) Field of Classification Search
CPC ... B60N 2/12; B60N 2/14; B60N 2/20; B60N 2/0224
See application file for complete search history.

(56) References Cited

U.S. PATENT DOCUMENTS

| | | |
|---|---|---|
| 4,884,843 A | 12/1989 | DeRees |
| 6,336,679 B1 | 1/2002 | Smuk |
| 6,827,404 B2 | 12/2004 | Blair et al. |
| 6,986,551 B2 | 1/2006 | Ohba |
| 7,533,937 B2 | 5/2009 | Becker et al. |
| 8,016,354 B2 | 9/2011 | Veluswamy et al. |
| 8,038,198 B2 | 10/2011 | Yamagishi |
| 8,496,294 B2 | 7/2013 | Holdampf et al. |
| 8,517,328 B2 | 8/2013 | Wieclawski et al. |

(Continued)

*Primary Examiner* — Philip F Gabler
(74) *Attorney, Agent, or Firm* — Vichit Chea; Price Heneveld LLP

(57) ABSTRACT

A vehicle seating assembly is provided that includes a pivot bracket coupled to a vehicle floor and disposed at a front of a seat frame, a gear assembly and a locking disk assembly disposed around an axis of rotation defined by the pivot bracket, wherein the gear assembly and the locking disk assembly are configured to each alternatively move the seating assembly from a sitting position to a standing position, and a track assembly disposed on the vehicle floor and between opposing side brackets of a seat frame. The track assembly includes a cam assembly movable between a locked position and an unlocked position. The vehicle seating assembly further includes a crank assembly extending between the pivot bracket and the cam assembly and configured to move the cam assembly from the locked position to the unlocked position.

7 Claims, 39 Drawing Sheets

(56) References Cited

U.S. PATENT DOCUMENTS

| | | |
|---|---|---|
| 9,061,605 B2 | 6/2015 | Hurst et al. |
| 9,428,086 B2 | 8/2016 | Aktas |
| 9,827,879 B2 | 11/2017 | Fujita et al. |
| 9,868,369 B1 | 1/2018 | Aktas |
| 10,239,423 B2 | 3/2019 | Aktas |
| 10,239,427 B2 | 3/2019 | Keyser et al. |
| 10,308,146 B1 | 6/2019 | Kish et al. |
| 10,442,320 B2 | 10/2019 | Kish et al. |
| 10,618,444 B2 | 4/2020 | Kish et al. |
| 11,097,642 B2 | 8/2021 | Line et al. |
| 11,180,055 B2 | 11/2021 | Aktas et al. |
| 11,260,776 B1 | 3/2022 | Aktas et al. |
| 11,332,042 B2 | 5/2022 | Aktas et al. |
| 11,332,050 B1 | 5/2022 | Aktas et al. |
| 11,358,501 B2 | 6/2022 | Susko et al. |
| 11,407,332 B1* | 8/2022 | Aktas .................. B60N 2/0224 |
| 11,807,137 B2* | 11/2023 | Aktas .................. B60N 2/0224 |
| 11,904,736 B2* | 2/2024 | Aktas ...................... B60N 2/14 |
| 2006/0131946 A1 | 6/2006 | Andrigo et al. |
| 2009/0230744 A1 | 9/2009 | Szybisty et al. |
| 2017/0253146 A1* | 9/2017 | Cooley .................. B60N 2/123 |
| 2019/0225130 A1* | 7/2019 | Kish ....................... B60N 2/12 |

* cited by examiner

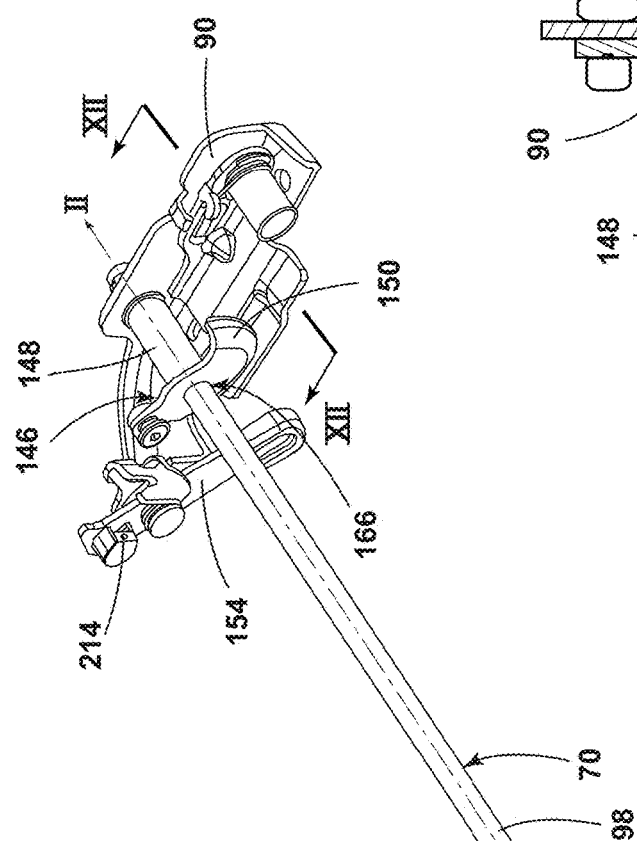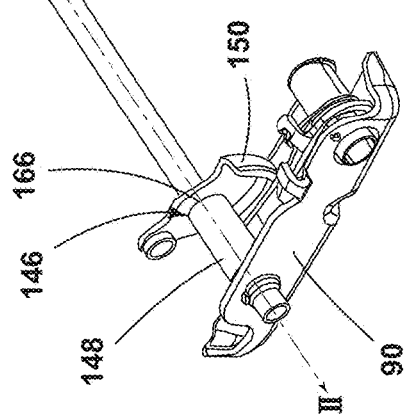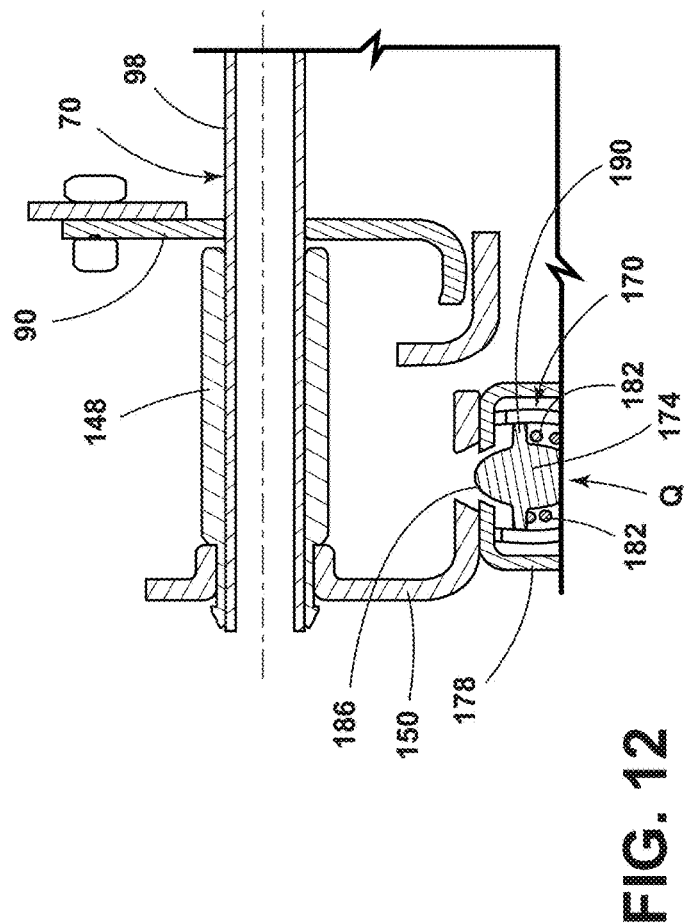

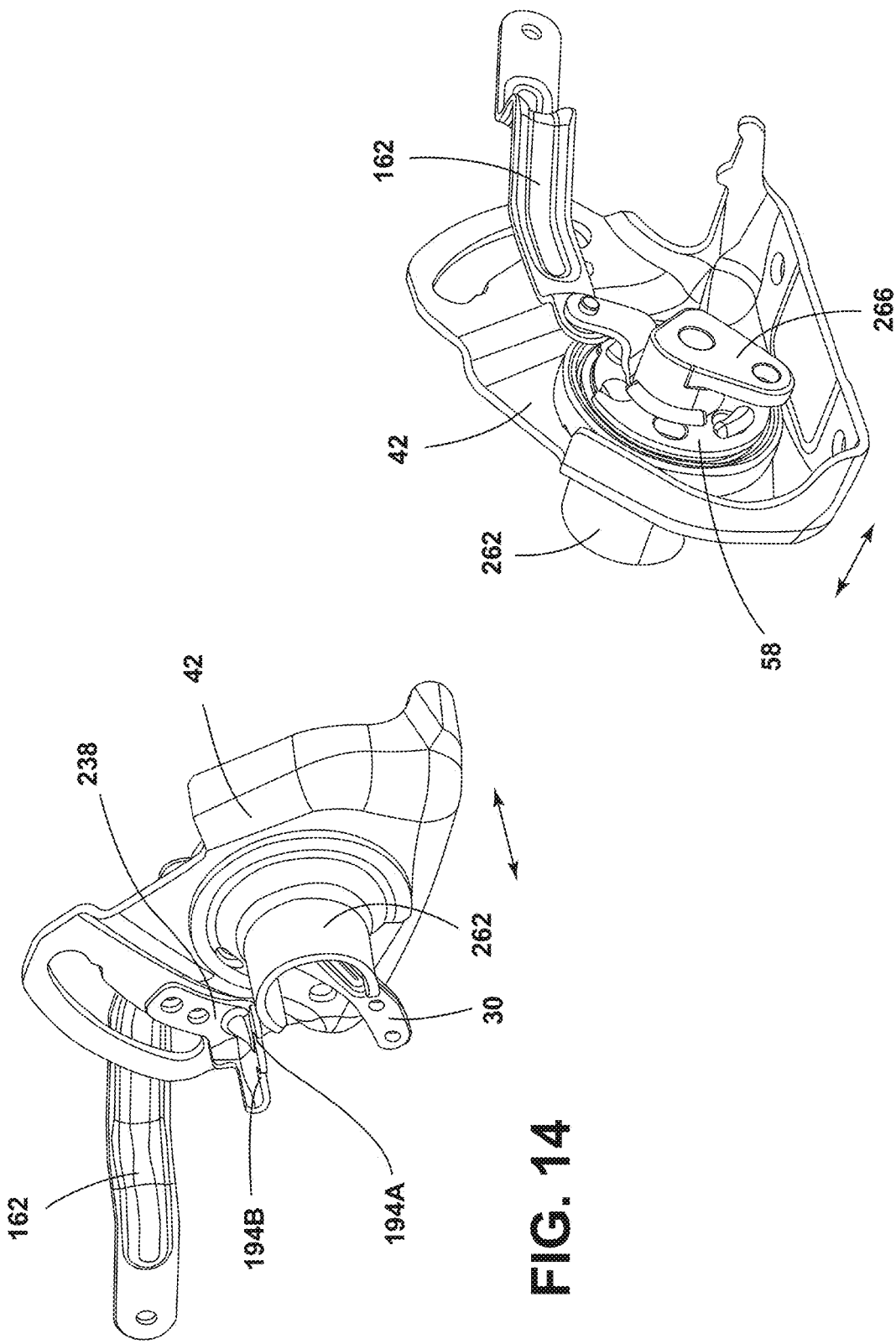

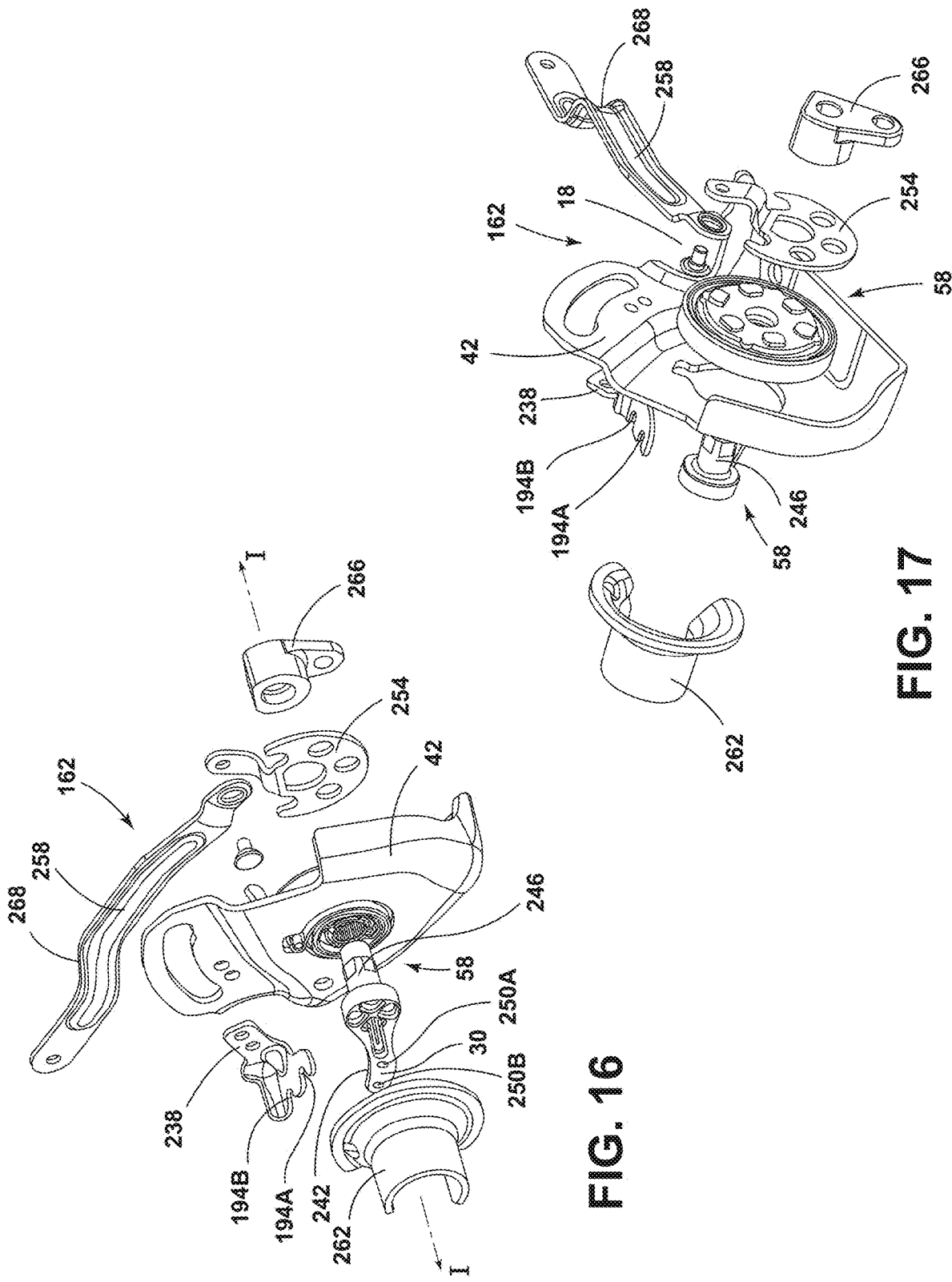

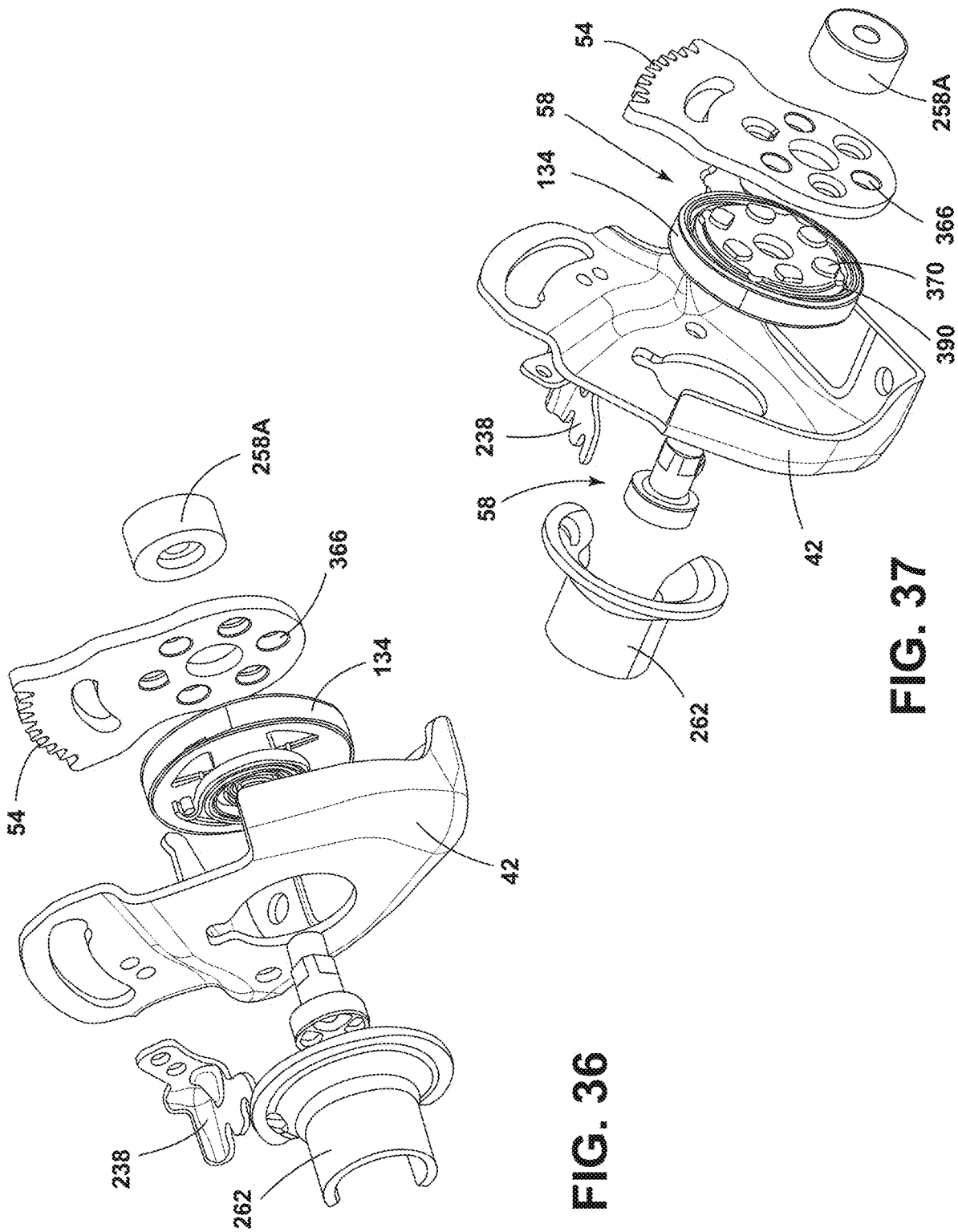

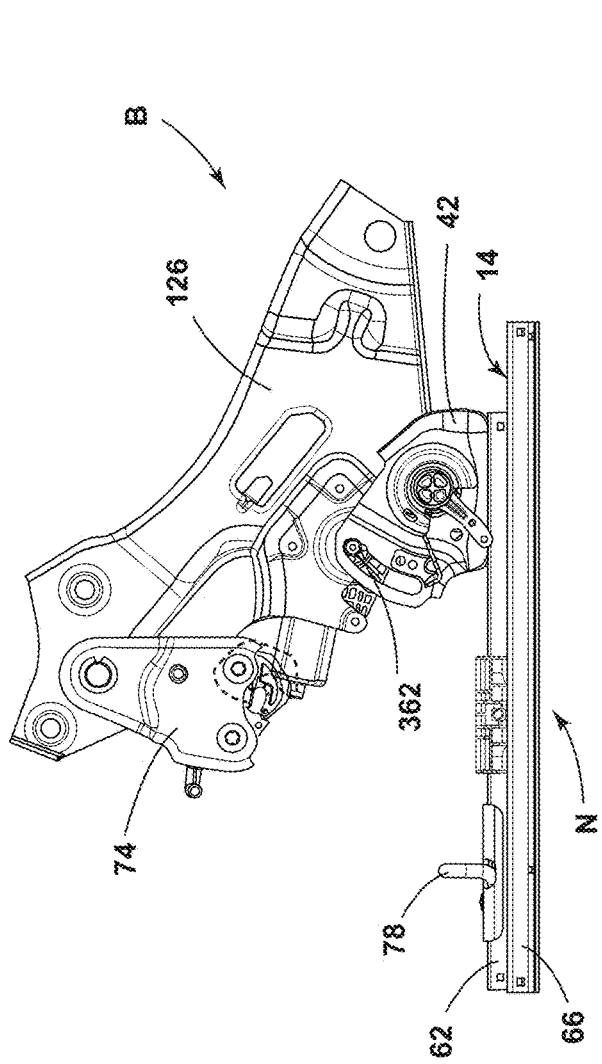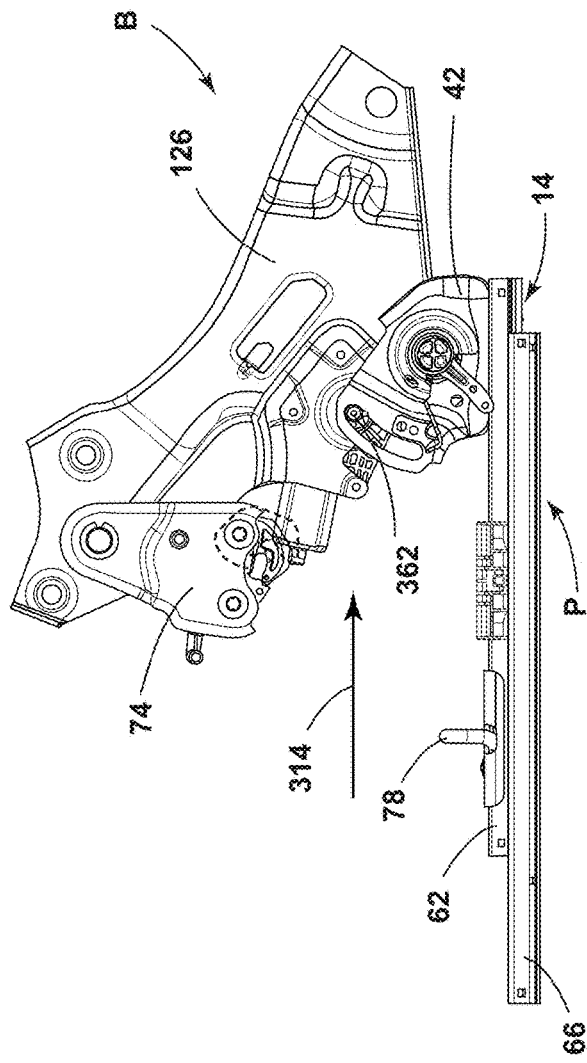

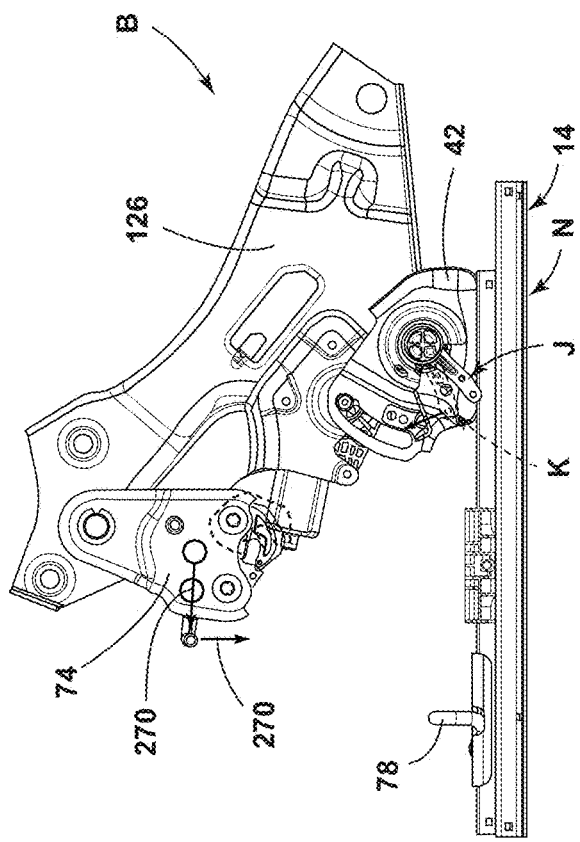
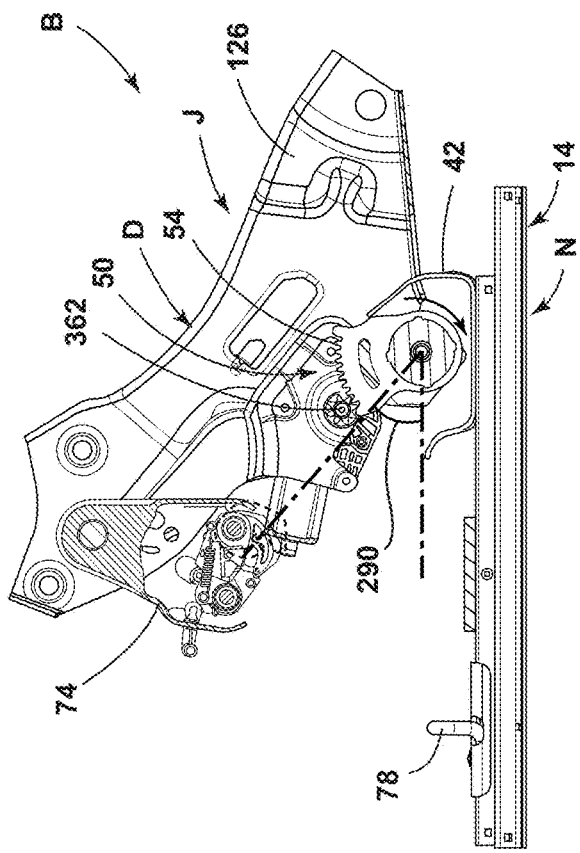
FIG. 46
FIG. 47

MANUAL AND POWERED ACTUATION OF TRACK ASSEMBLY

CROSS-REFERENCE TO RELATED APPLICATION

This application is a divisional of U.S. patent application Ser. No. 17/850,033, now U.S. Pat. No. 11,807,137, filed Jun. 27, 2022, entitled "MANUAL AND POWERED ACTUATION OF TRACE ASSEMBLY," which is a divisional of U.S. patent application Ser. No. 17/174,396 filed Feb. 12, 2021, now U.S. Pat. No. 11,407,332, entitled "MANUAL AND POWERED ACTUATION OF TRACK ASSEMBLY." The aforementioned related application is hereby incorporated by reference.

FIELD OF THE DISCLOSURE

The present disclosure generally relates to a vehicle seating assembly, and more specifically to a vehicle seating assembly that may be arranged in various positions.

BACKGROUND OF THE DISCLOSURE

A vehicle seating assembly may have features that may allow the vehicle seating assembly to be arranged in various positions to accommodate various vehicle user preferences.

SUMMARY OF THE DISCLOSURE

According to a first aspect of the present disclosure, a vehicle seating assembly is provided. The vehicle seating assembly includes a pivot bracket coupled to a vehicle floor and disposed at a front of a seat frame, a gear assembly and a locking disk assembly disposed around an axis of rotation defined by the pivot bracket, wherein the gear assembly and the locking disk assembly are configured to each alternatively move the seating assembly from a sitting position to a standing position, and a track assembly disposed on the vehicle floor and between opposing side brackets of a seat frame. The track assembly includes a cam assembly movable between a locked position and an unlocked position. The vehicle seating assembly further includes a crank assembly extending between the pivot bracket and the cam assembly and configured to move the cam assembly from the locked position to the unlocked position.

Embodiments of the first aspect of the present disclosure can include any one or a combination of the following features:
- the track assembly includes a rail slidably coupled to a track, wherein if the cam assembly is in the locked position, then the rail is fixed to the track, and wherein if the cam assembly is in the unlocked position, then the rail is slidable along the track;
- the cam assembly is in the unlocked position when the seating assembly is in the standing position;
- the crank assembly is rotatably coupled to the locking disk assembly;
- the crank assembly includes a linkage having a first end rotatably coupled to the locking disk assembly and a second end coupled to the cam assembly;
- the linkage includes a bend;
- the cam assembly includes a cam pivotably coupled to the second end of the linkage and an actuation plate;
- when the cam assembly is in the locked position, then a portion of the cam having an eccentric profile engages with the actuation plate;
- when the cam assembly is in the unlocked position, then a portion of the cam having a concentric profile engages with the actuation plate;
- the cam assembly is rotatable about a cam axis between the locked position and the unlocked position;
- when the cam assembly is in the unlocked position, then the actuation plate is in a final depressed position; and/or
- movement of the actuation plate from an initial depressed position to the final depressed position moves a button from an extended position to a retracted position to allow the rail to slide along the track.

According to a second aspect of the present disclosure, a vehicle seating assembly is provided. The vehicle seating assembly includes a seat rotatable about a pivotable coupling defined by a pivot bracket and disposed at a front of the seat, wherein the seat is rotatable between a sitting position and a standing position, and a track assembly disposed along a vehicle floor and operably coupled to the seat, wherein if the seat is in the standing position, then the seat is slidable along the track assembly when a cam assembly operationally coupled to the pivotable coupling moves from a locked position to an unlocked position relative to the track assembly.

Embodiments of the second aspect of the present disclosure can include any one or a combination of the following features:
- a crank assembly extending between the pivot bracket and the cam assembly;
- the cam assembly includes a cam having an eccentric profile that engages with the track assembly when the cam assembly is in the locked position;
- the cam includes a concentric profile that engages with the track assembly when the cam assembly is in the unlocked position;
- if the cam assembly is in the unlocked position, the cam exerts a force on a button disposed in the track assembly; and/or
- if the seat is disposed at less than a predetermined angle of inclination from an initial angle of inclination, then the seat is minimally movable along the track assembly and wherein if the seat is disposed at an angle of inclination greater than or substantially equal to the predetermined angle of inclination, then the seat is movable along the track assembly.

According to a third aspect of the present disclosure, a track release module for a vehicle seating assembly is provided. The track release module includes a seat frame slidably coupled to a track assembly and rotatable about an axis transverse to a front of the seat frame and movable between a sitting position and a standing position, and a track release bar extending between opposing sides of a seat frame and rotationally coupled to a pair of cam assemblies disposed above a pair of track assemblies. Placement of the seating assembly in the standing position allows the seating assembly to slide along the track assembly between a first position and a second position. A movement of one of the pair of cam assemblies between a locked position and an unlocked position causes the track release bar to move the other of the pair of cam assemblies between a locked position and an unlocked position.

Embodiments of a third aspect of the present disclosure can include any one or a combination of the following features:
- the seating assembly is selectively and alternatively movable between the sitting position and the standing position by powered actuation or manual actuation.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 11 is a top perspective view of a track module, according to an aspect of the disclosure;

FIG. 12 is a cross-sectional view of the track module of FIG. 11 taken along line XII-XII of FIG. 11, according to an aspect of the disclosure;

FIG. 14 is a right side perspective view of a pivotable coupling and a pivot bracket disposed at a front left side of the seat frame, according to an aspect of the disclosure;

FIG. 15 is a left side perspective view of a pivotable coupling and the pivot bracket disposed at a front left side of the seat frame of FIG. 14, according to an aspect of the disclosure;

FIG. 16 is a right side perspective exploded view of the pivotable coupling and a pivot bracket disposed at a front left side of the seat frame, according to an aspect of the disclosure;

FIG. 17 is a left side perspective exploded view of the pivotable coupling and a pivot bracket disposed at a front left side of the seat frame of FIG. 16, according to an aspect of the disclosure;

FIG. 36 is a right side exploded perspective view of the pivot bracket of FIG. 34, according to an aspect of the disclosure;

FIG. 37 is a left side exploded perspective view of the pivot bracket of FIG. 34, according to an aspect of the disclosure;

FIG. 42 is a right side elevational view of portions of a seating assembly frame in the standing position disposed on a track assembly in a first position along the track, according to an aspect of the disclosure;

FIG. 43 is a right side elevational view of portions of a seating assembly frame of FIG. 42 in the standing position disposed on a track assembly in a third position along the track, according to an aspect of the disclosure;

FIG. 46 is a right side elevational view of the seating assembly in a standing position at a first position along the track due to manual actuation of the seating assembly, according to an aspect of the disclosure;

FIG. 47 is a right side elevational view of the seating assembly in a standing position at a predetermined angle of inclination and at a first position along the track assembly due to manual actuation of the seating assembly of FIG. 46, according to an aspect of the disclosure;

DETAILED DESCRIPTION OF THE PREFERRED EMBODIMENTS

Figure 1:
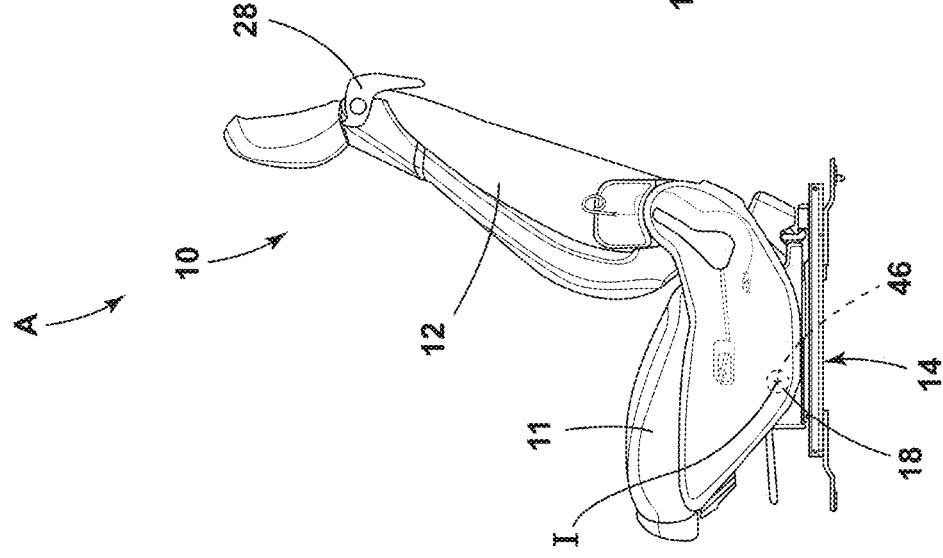
FIG. 1 is a left side elevational view of a seating assembly in the sitting position and at a first position along the track, according to an aspect of the disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the vehicle seating assemblies described below and shown in the attached figures, a vehicle seating assembly 10 may be described from the vantage point of an occupant seated in the seating assembly 10. The side of a seating assembly 10 disposed on a right side of a seated occupant may be referred to as a right side of the seating assembly 10. The side of the seating assembly 10 disposed on a left side of a seated occupant may be referred to as a left side of the seating assembly 10.

Figure 3:
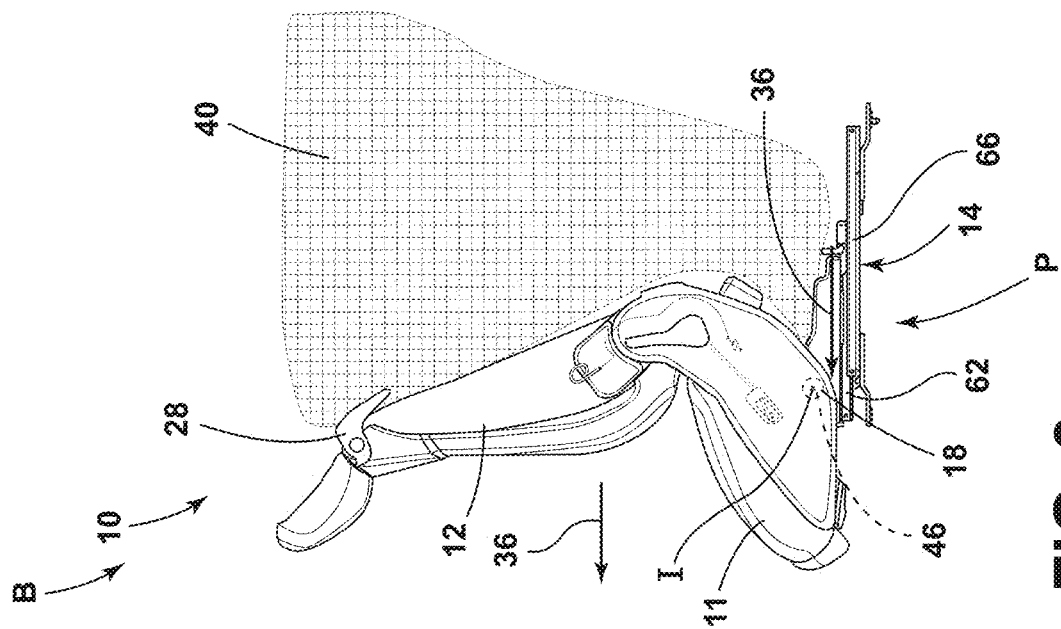
FIG. 3 is a left side elevational view of the seating assembly of FIG. 1 in the sitting position and at a third position along the track, according to an aspect of the disclosure.
Figure 2:
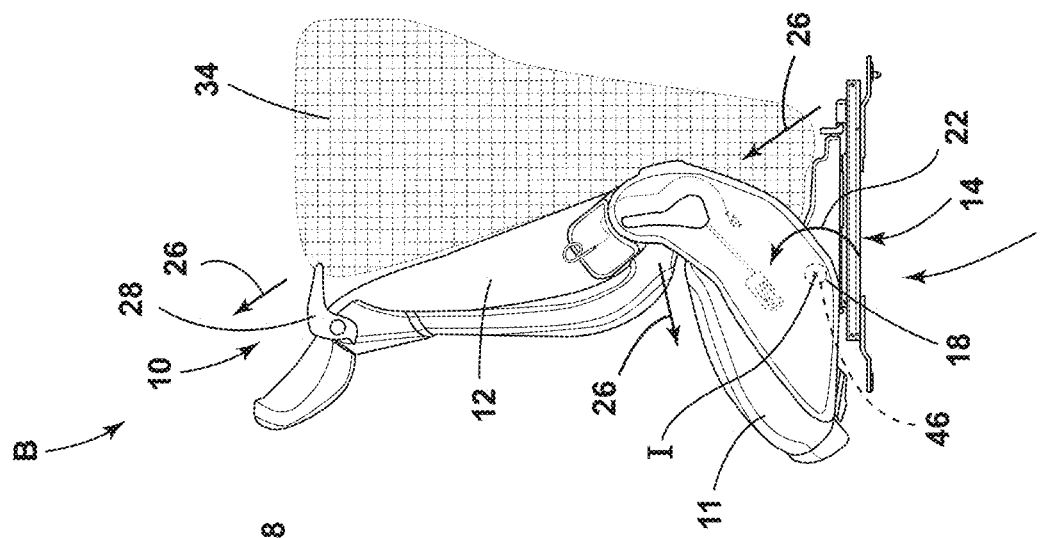
FIG. 2 is a left elevational view of the seating assembly of FIG. 1 in the standing position and at a first position along the track, according to an aspect of the disclosure.

Referring to FIGS. 1-3, the seating assembly 10 may include a seat 11 and a seatback 12 disposed at various positions along a track assembly 14. The seating assembly 10 may be rotated about a pivotable coupling 18 disposed at the front of the seating assembly 10 between a sitting position A (FIG. 1) and a standing position B (FIGS. 2 and 3).

Vehicle occupants may desire a seating assembly that may be repositioned and moved within a vehicle, thereby creating additional space for moving persons and cargo into and out of a vehicle. Additionally, workers engaged in loading vehicles at travel hubs such as airports, train stations, and other locations may desire a vehicle that includes seating assemblies that are repositionable and movable to allow for convenient loading and unloading of the vehicle. Vehicle seating assemblies may be repositioned and moved by powered actuation or manual actuation. Powered actuation may include electromechanical and mechanical movement of seating assembly parts in response to inputs from sensors, remotes, manual push buttons, and other devices. Manual actuation may include electromechanical and mechanical movement of seating assembly parts in response to manual forces exerted on pull straps, levers, and other seating assembly parts. Vehicle occupants and users who work to load and unload the vehicle may enjoy the convenience of a movable vehicle seating assembly.

With reference to FIG. 2, the arrow 22 shows the direction of rotation of the seating assembly 10 around the pivotable coupling 18. The arrows 26 represent movement of the seating assembly 10 from the sitting position A to the standing position B. A lever 28 may be used to manually actuate the components of the seating assembly 10 to move the seating assembly 10 from the sitting position A to the standing position B. Movement of the seating assembly 10 from the sitting position A to the standing position B may provide an occupant seated behind the seating assembly 10 with space (represented by shaded area 34) for egress from the vehicle.

Referring now to FIG. 3, the seating assembly 10 in the standing position B may be moved along the track assembly 14 in the direction shown by arrows 36 from a first position N (FIG. 2) on the track assembly 14 to a second position P (FIG. 3) on the track assembly 14. The seating assembly 10 may be coupled to a rail 62 that may be slidable within the track 66 in the track assembly 14. Movement of the seating assembly 10 in the standing position B from the first position N to the third position P along the track assembly 14 may provide an occupant seated behind the seating assembly 10 with additional space (represented by shading 40) for egress from the vehicle.

Figure 54:
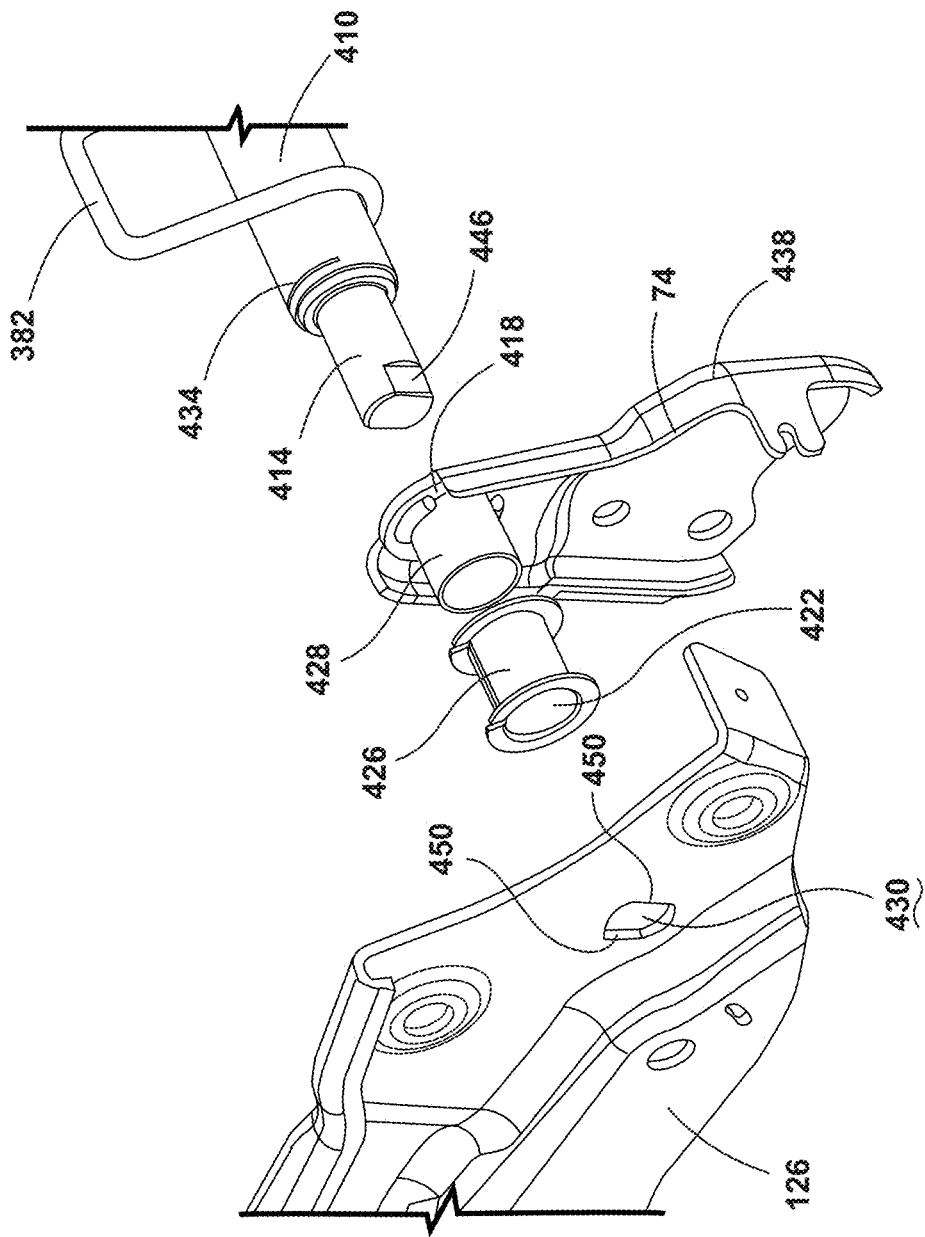
FIG. 54 is an exploded view of the left side bracket, a latch plate, and a portion of the connecting bar, according to an aspect of the disclosure.
Figure 55:
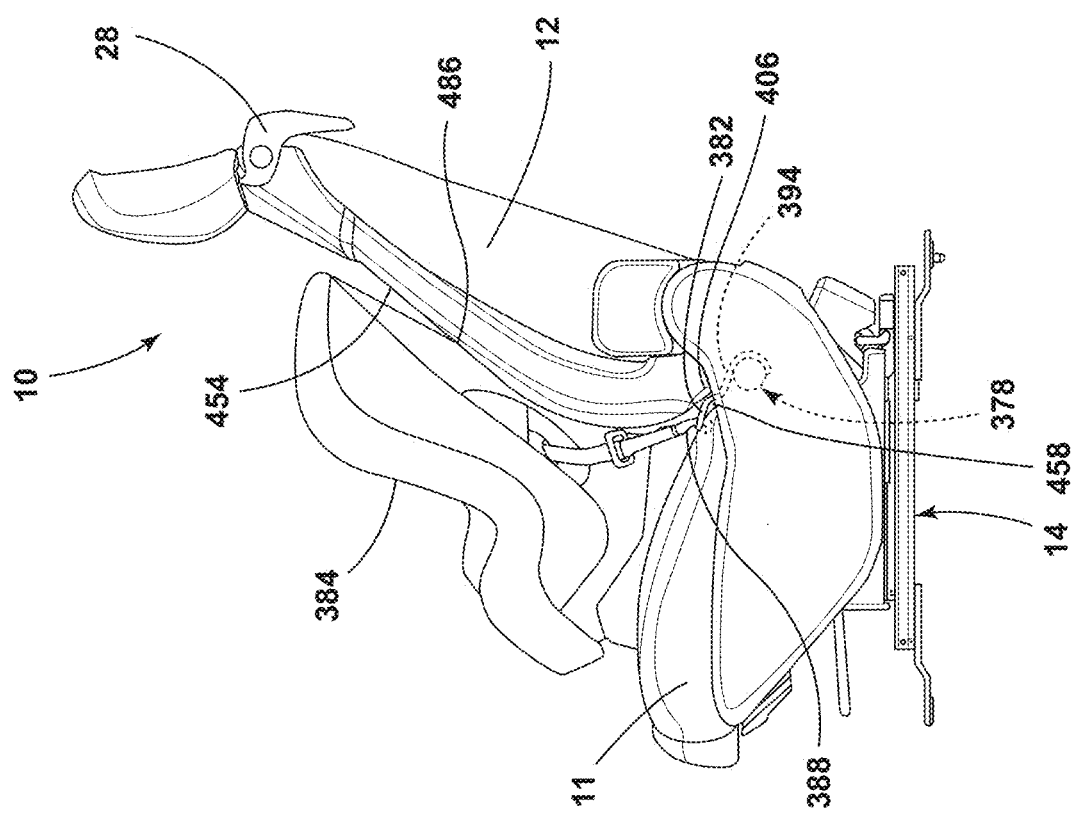
FIG. 55 is a perspective view of a child seat disposed on a seating surface of the seating assembly and attached to the connecting bar, according to an aspect of the disclosure.

Referring to FIGS. 1-54, a vehicle seating assembly 10 may include a seating assembly frame 37. The seating assembly frame 37 may include a seat frame 38 and a seatback frame 39. The seating assembly frame 37 may be movable between a sitting position A and a standing position B. The seating assembly frame 37 may be coupled to a pivot bracket 42. A cross member 46 may extend through the pivot bracket 42 and may define an axis of rotation I. A gear assembly 50 be coupled to the pivot bracket 42. The gear assembly 50 may include a sector bracket 54 rotationally coupled to the cross member 46 and a pinion gear 362 operable to rotate along the sector bracket 54 from a first position D to a second position E, thereby moving the seat frame 38 from a sitting position A to a standing position B. The vehicle seating assembly 10 may include a locking disk assembly 58 coupled to the pivot bracket 42, then the seat frame 38 is rotatable about the axis of rotation I defined by the cross member 46.

Figure 4:
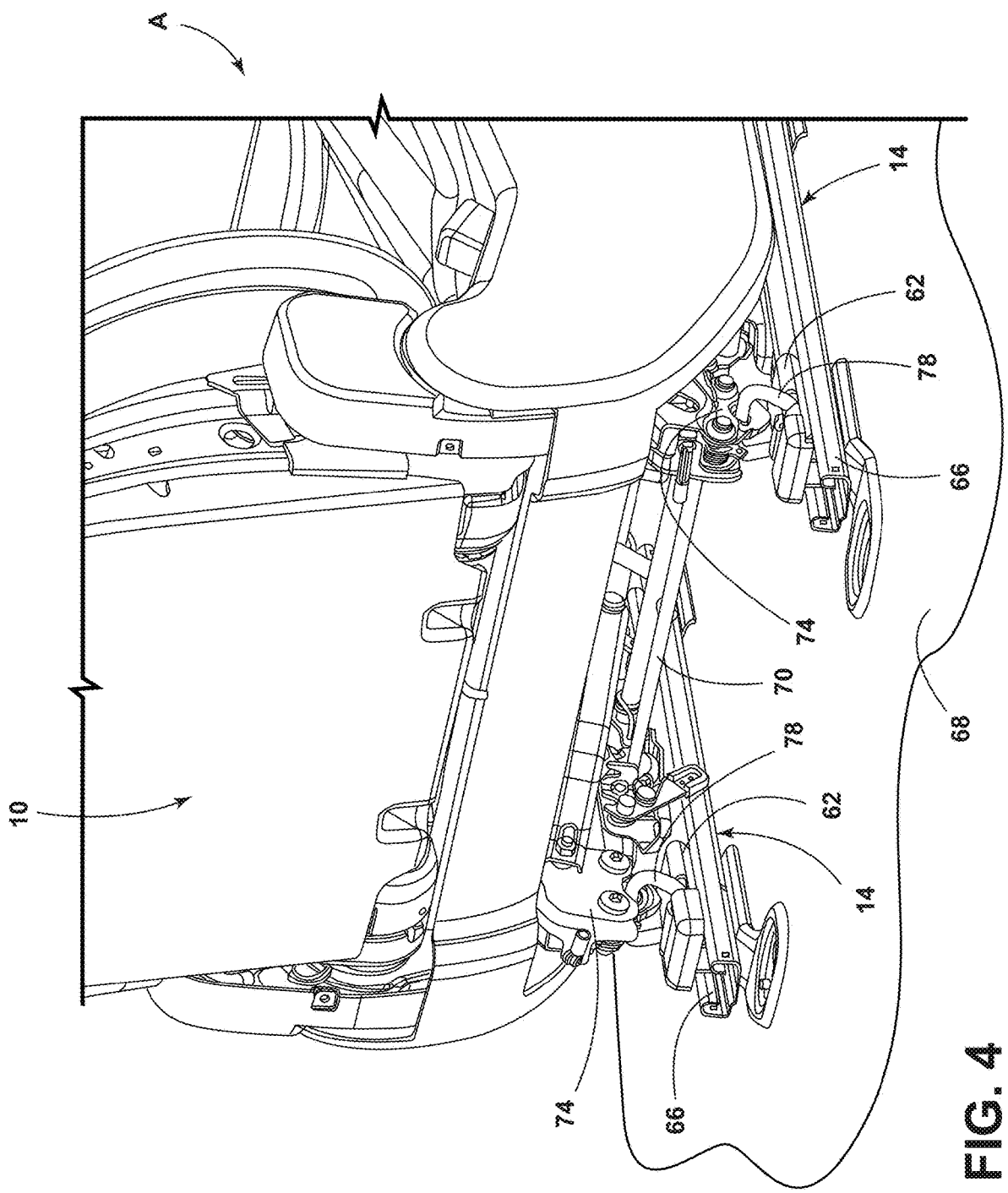
FIG. 4 is a rear perspective view of a seating assembly in the sitting position, according to an aspect of the disclosure.

With reference now to FIG. 4, the rear of the seating assembly 10 in the sitting position A may be disposed on the track assembly 14. The track assembly 14 may include slidable rails 62 disposed in tracks 66. The tracks 66 may be disposed along a vehicle floor 68. A track release module 70 may extend between opposing track assemblies 14. The track release module 70 may be activated to release the rails 62 from the tracks 66 so that the seating assembly 10 on the rails 62 may slide within the tracks 66 from a first position N (FIG. 2) to a second position O (FIG. 22) to a third position P (FIG. 3). A latch assembly 74 may be attached to a striker 78 when the seating assembly 10 is in the sitting position A. The latch assembly 74 may be released from the striker 78 to allow movement of the seating assembly 10 from the sitting position A to the standing position B.

Figure 5:
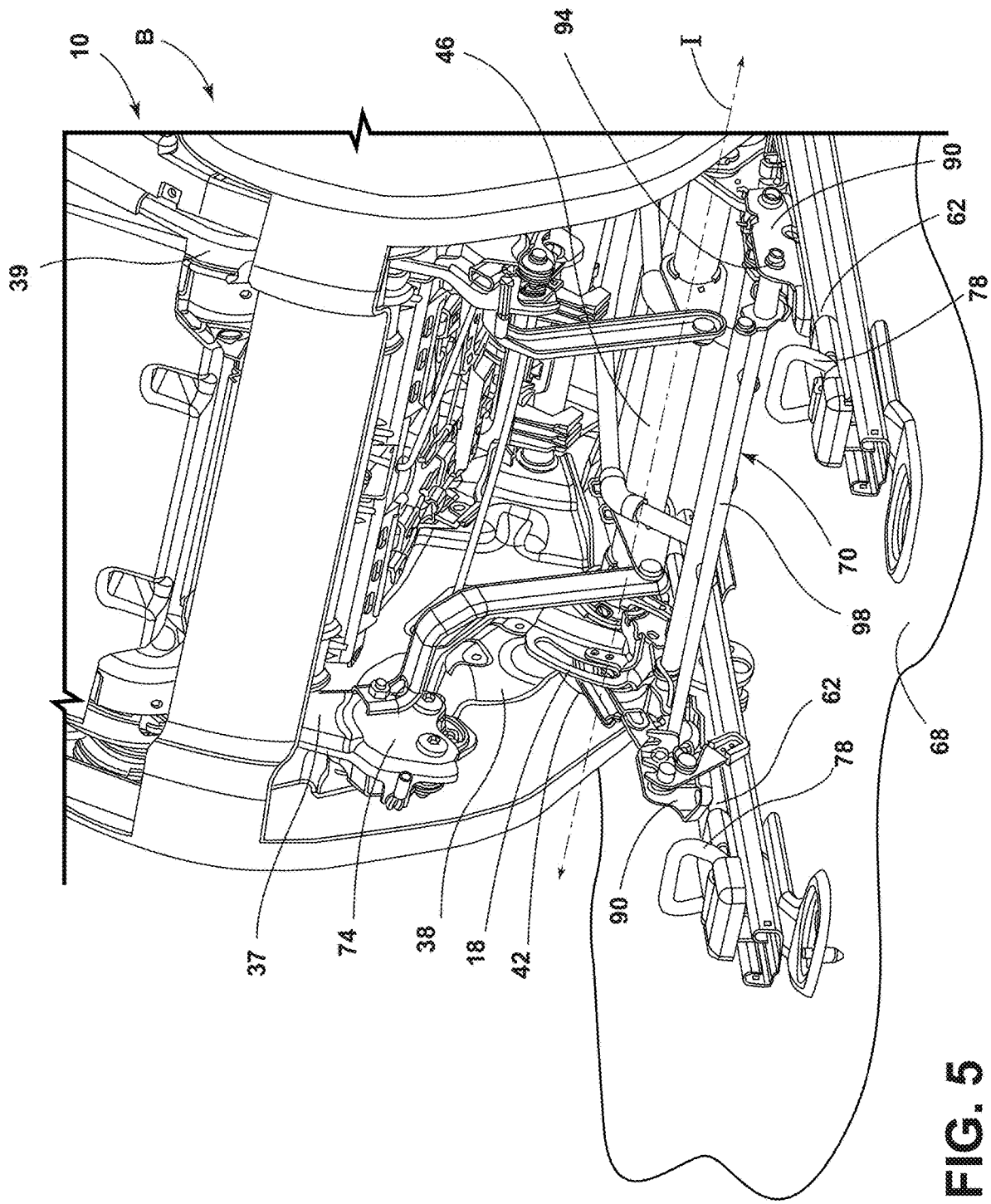
FIG. 5 is a rear perspective view of the seating assembly of FIG. 4 in the standing position, according to an aspect of the disclosure.

Referring now to FIG. 5, the seating assembly 10 of FIG. 4 is shown in the standing position B. The latch assemblies 74 have been detached from the strikers 78. Track release mounting brackets 90 may secure the track release module 70 to the rail 62. The track release mounting brackets 90 may include apertures 94 for receiving the track release bar 98. As the seating assembly 10 moves from the sitting position A to the standing position B, the seating assembly 10 may rotate about the pivotable coupling 18 disposed at the front of the seating assembly 10. The pivotable coupling 18 may define the axis of rotation I. The cross member 46 may extend from the pivot bracket 42 that may define the pivotable coupling 18.

Figure 6:
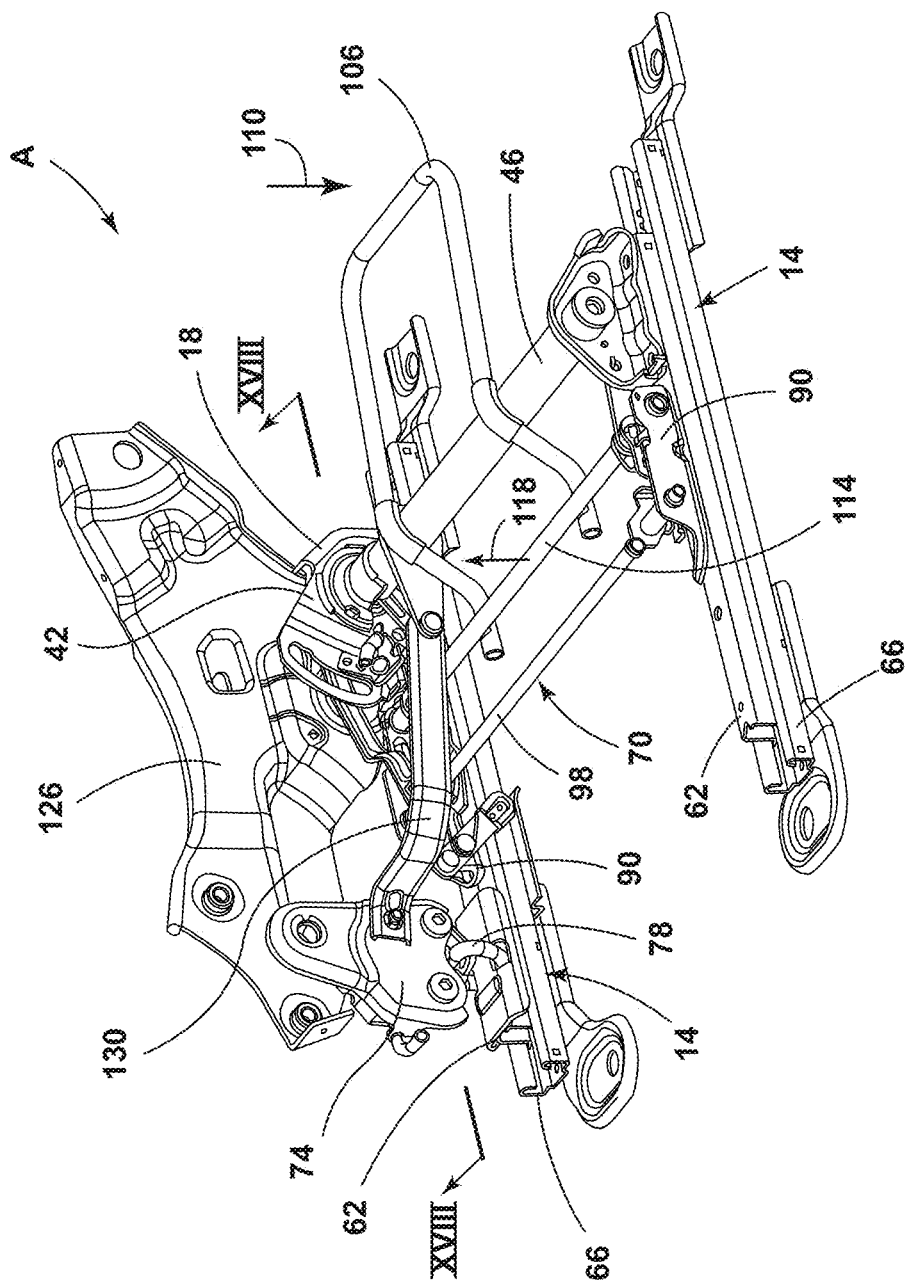
FIG. 6 is a rear perspective view of portions of a seating assembly frame in the sitting position disposed on a track assembly, according to an aspect of the disclosure.
Figure 7:
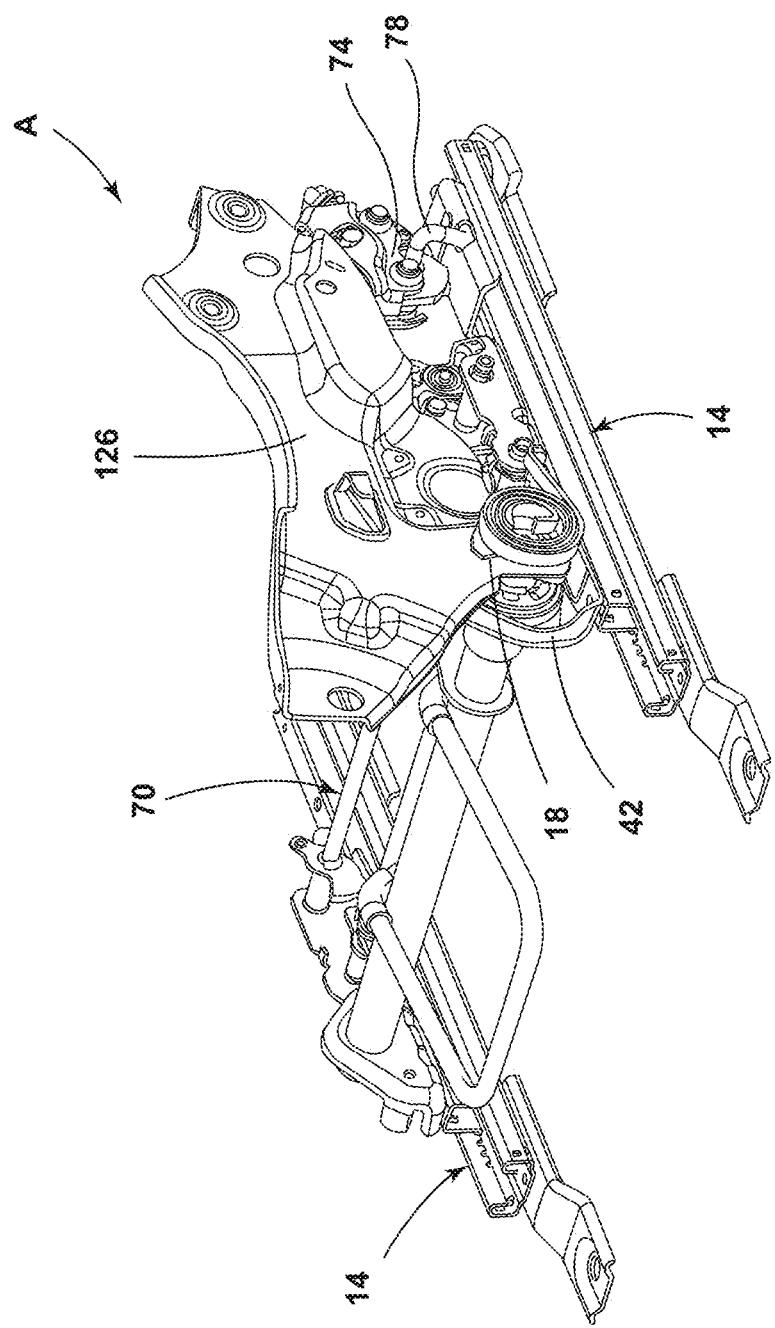
FIG. 7 is a front perspective view of portions of a seating assembly frame in the sitting position disposed on a track assembly of FIG. 6, according to an aspect of the disclosure.
Figure 52:
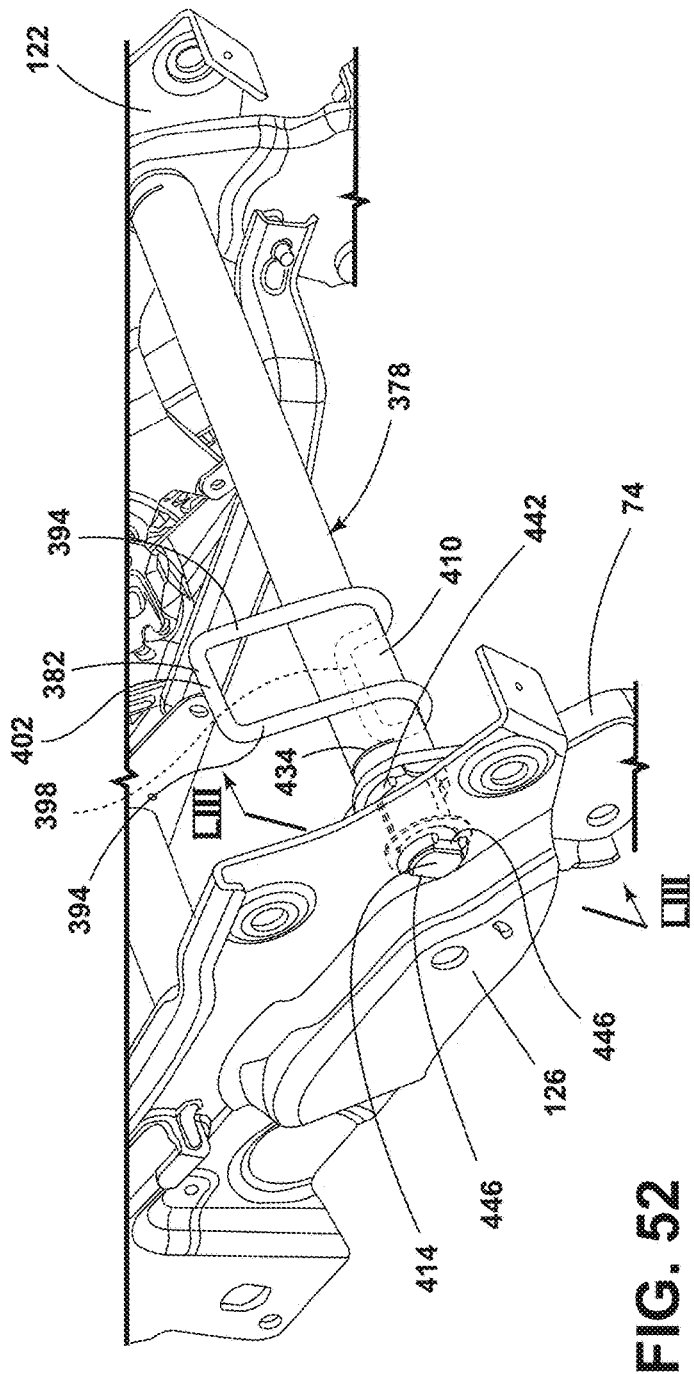
FIG. 52 is a left side perspective view of side brackets, latch assemblies, and a connecting bar disposed at a rear of a seating assembly, according to an aspect of the disclosure.

With reference now to FIGS. 6-7, parts of the seating assembly frame 37 and the track assemblies 14 that may be used for manual actuation of the track assemblies 14 are shown. A release bar assembly 106 may be moved in a downward direction shown by arrow 110 to manually release the rails 62 from the tracks 66 so that the rails 62 may slide along the tracks 66. The release bar assembly 106 may lift the auxiliary track release bar 114 upward in the direction shown by arrow 118 to release the rails 62 from the tracks 66. The seat frame 38 may include right and left side brackets 122, 126. See, FIG. 52. The right and left side brackets 122, 126 may be rotatable about the pivotable coupling 18 defined by the axis of rotation I when the seating assembly 10 moves between the sitting position A and the standing position B. A link 130 may extend from the latch assembly 74 to the cross member 46 to tuck the latch assembly 74 into the seat frame 38 when the seating assembly 10 moves from the sitting position A to the standing position B.

Figure 8:
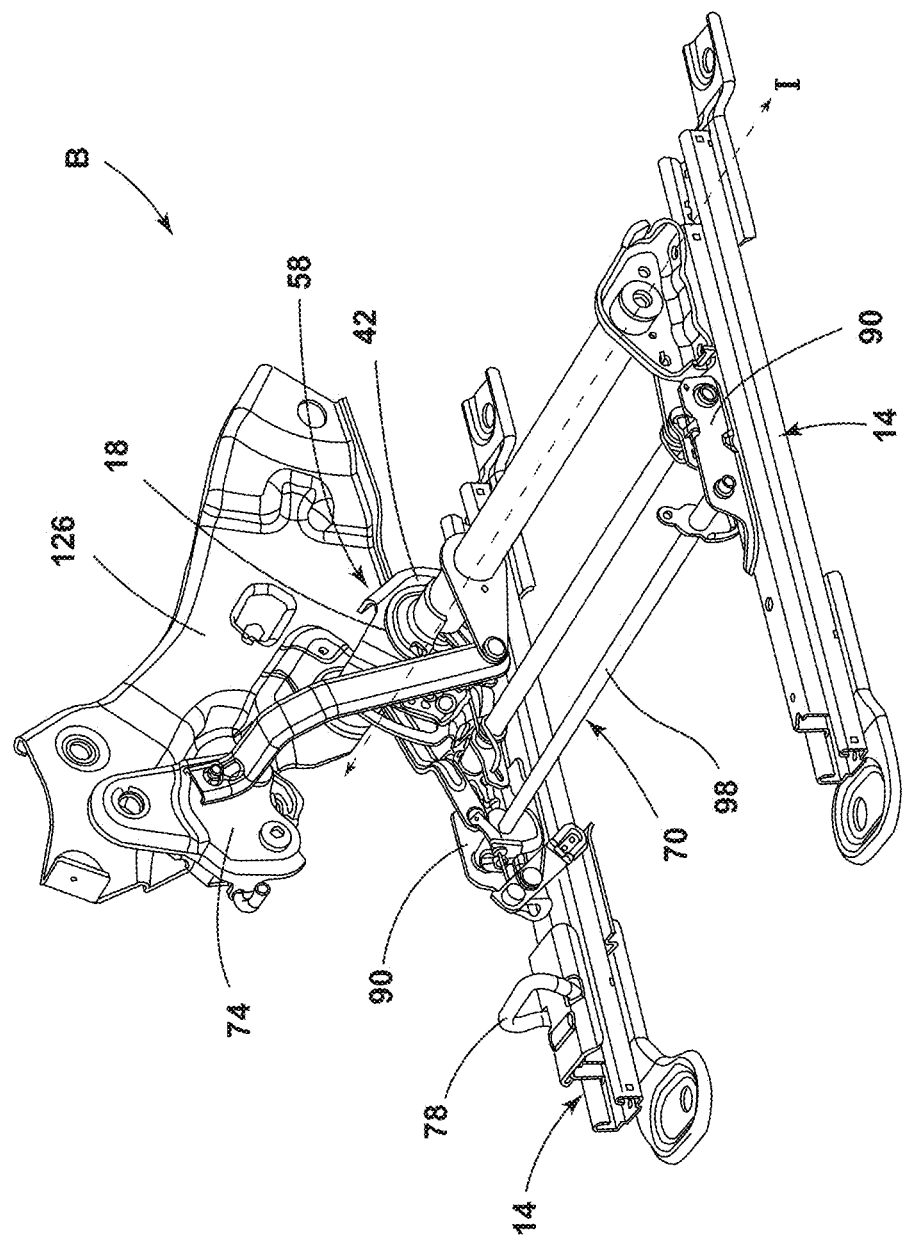
FIG. 8 is a rear perspective view of the portions of a seating assembly frame of FIG. 6 in the standing position disposed on a track assembly, according to an aspect of the disclosure.
Figure 9:
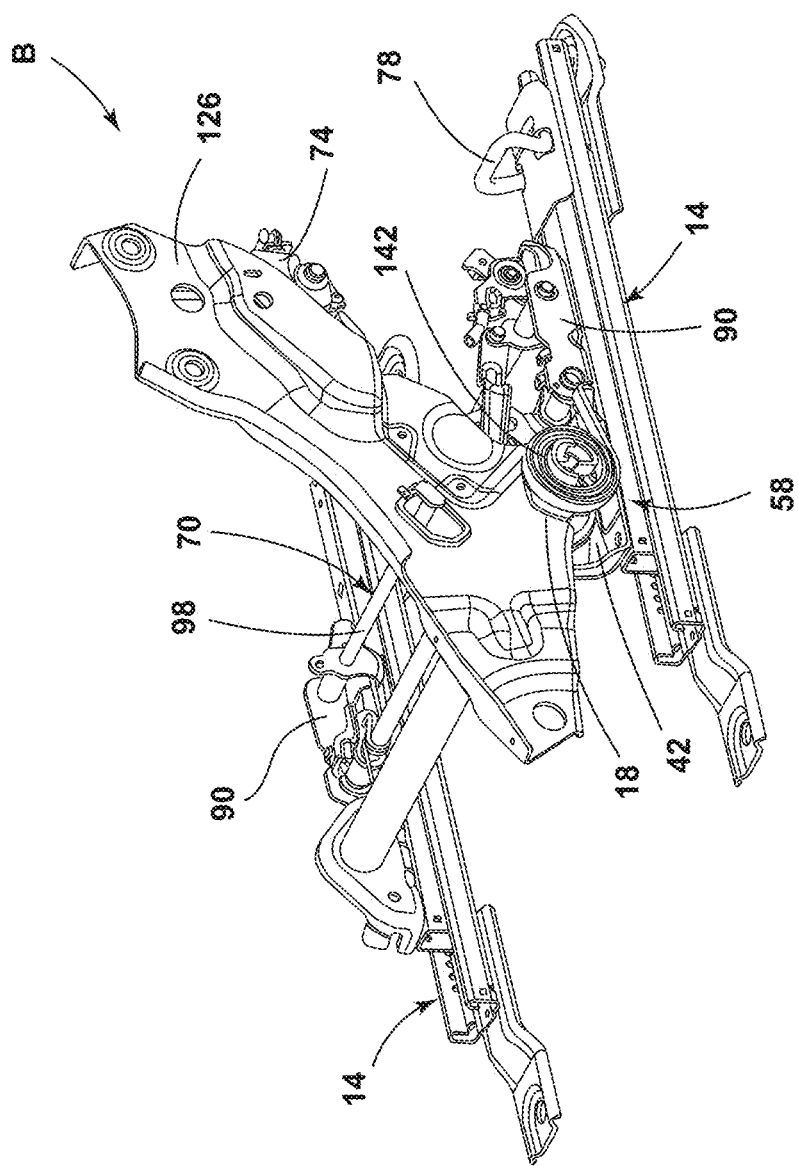
FIG. 9 is a front perspective view of the portions of a seating assembly frame of FIG. 6 in the standing position disposed on a track assembly, according to an aspect of the disclosure.
Figure 44:
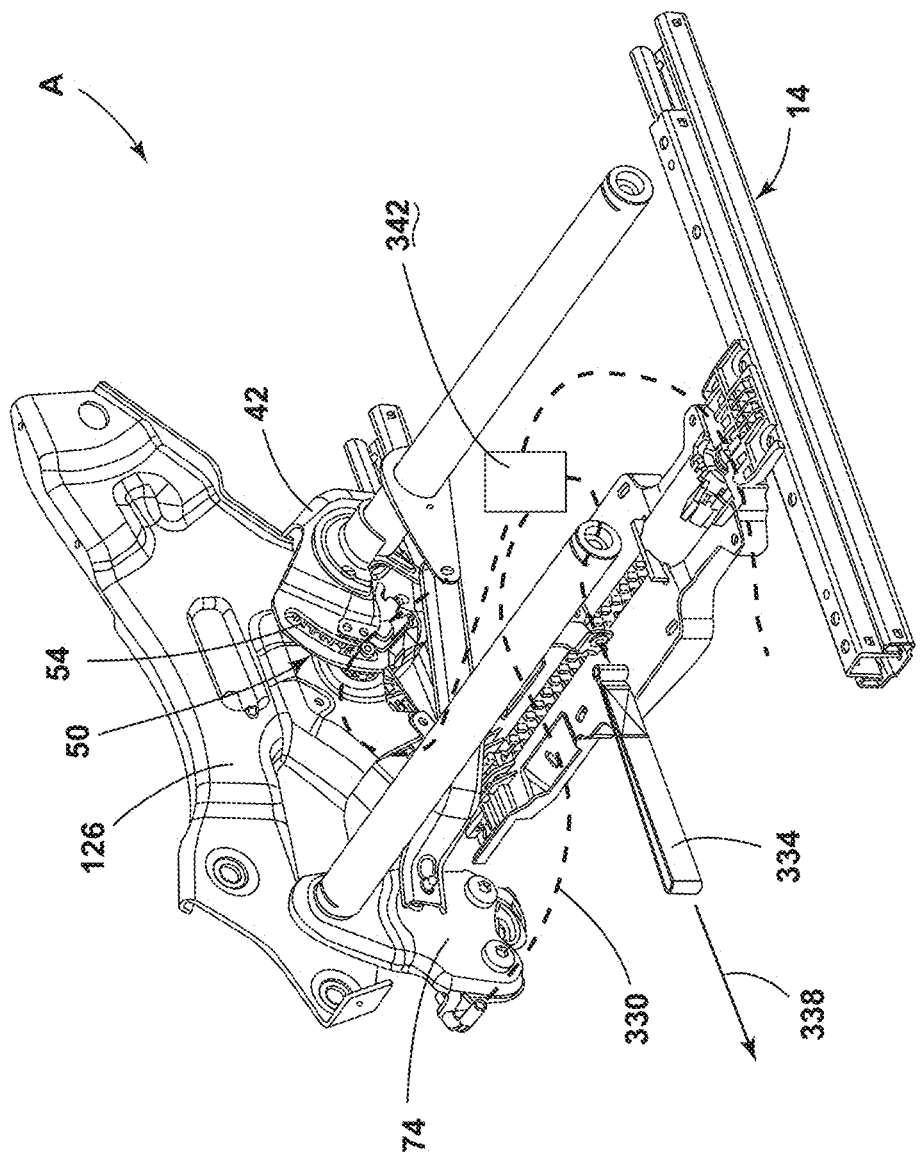
FIG. 44 is a perspective view of portions of a seating assembly frame and a track assembly including a manual actuator and pathways for releasing the latch assemblies from the strikers and moving the locking disk lever from the engaged position to the disengaged position, according to an aspect of the disclosure.

Referring now to FIGS. 8-9, the seat frame 38 parts that may be used for manually moving the seat frame 38 between the sitting position A and the standing position B are shown. In the standing position B, the right and left latch assemblies 74 may be released from the respective right and left strikers 78. A locking disk assembly 58 may be coupled to the pivotable coupling 18 disposed at the pivot bracket 42. A force (arrow 348) may be exerted on the release lever 30 to move the release lever 30 from an engaged position J to a disengaged position K so that the seating assembly 10 may be rotated about the axis of rotation I. See, FIG. 45. An occupant may manually move the seating assembly 10 from the sitting position A to the standing position B by exerting a manual force 338 on the seating assembly 10 to move the seating assembly 10 in the directions shown by arrows 22 and 26 in FIG. 2. See, FIG. 44. The torsion spring 142 may be disposed near the pivot bracket 42 and may be biased to provide an additional force to help rotate the seating assembly 10 from the sitting position A to the standing position B in the direction shown by arrow 22 in FIG. 2. In one example, an occupant may manually push the top of the seatback 12 forward to rotate the seating assembly 10 around the axis of rotation I in the direction shown by arrow 22 in FIG. 2.

Figure 10:
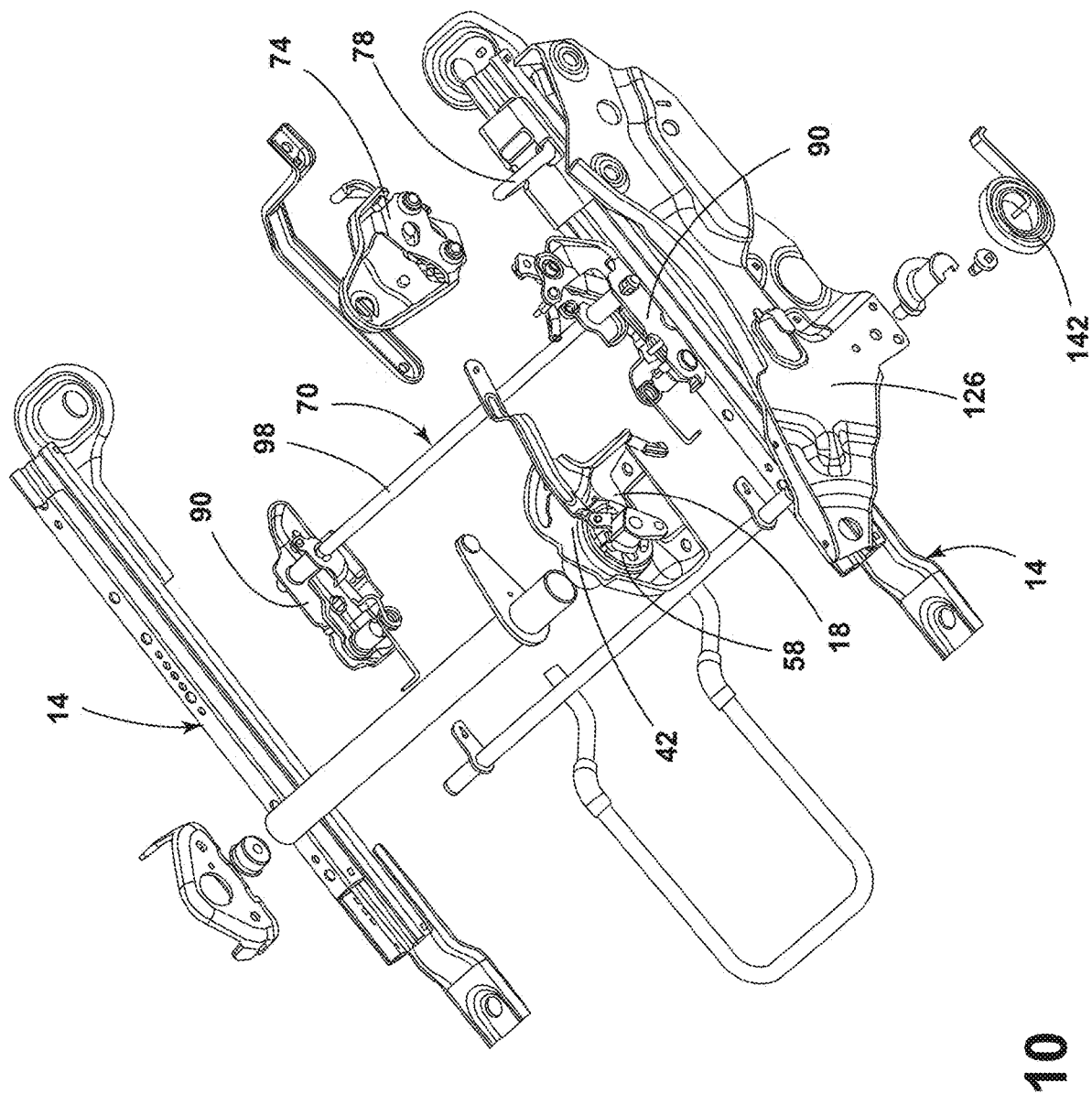
FIG. 10 is a top exploded view of portions of a seating assembly, according to an aspect of the disclosure.

Referring now to FIG. 10, an exploded view of the parts for manually moving the seating assembly 10 from the sitting position A to the standing position B and parts for manually moving the seating assembly 10 along the track assemblies 14 between the first position N, the second position O, and the third position P is shown. The exploded view of FIG. 10 shows the track release module 70, the pivotable coupling 18, and the locking disk assembly 58.

Referring now to FIGS. 11-12, the track release module 70 may include a track release bar 98 that may be disposed between right and left track release mounting brackets 90. The right and left track release mounting brackets 90 may be coupled to the rails 62 that may slide within the tracks 66. Right and left cam assemblies 146 may be positioned around the track release bar 98. A right bushing 148 may be disposed between the right track release mounting bracket 90 and the right cam 150. A left bushing 148 may be disposed between the left track release mounting bracket 90 and the left cam 150. A trigger lever 154 for manually releasing a rail 62 from a track 66 may be coupled to the left cam 150 with a spring 218. See, FIG. 13. The cams 150 may include crank assembly holes 158 for attaching the cams 150 to the crank assembly 162 (see FIG. 21). The cams 150 may include apertures 166 for receiving the track release bar 98. The apertures 166 may define the axis of rotation II of the cams 150. Rotational motion of the crank assembly 162 about the front pivotable coupling 18 may cause the left and right cams 150 to rotate about the cam axis of rotation II.

Referring now to FIG. 12, the left cam 150 may be positioned around the track release bar 98. The left bushing 148 may extend between the left track release mounting bracket 90 and the left cam 150. With continued reference to FIG. 12, the button assembly 170 may be disposed below the left cam 150. The button assembly 170 may be in the locked position Q when the button 174 is in the extended position Q. The button assembly 170 may include a spring-loaded button 174 in a housing 178. Spring 182 may be disposed around the button 174. When the button assembly 170 moves from the locked position Q to the unlocked position R, the button 174 may move from the extended position Q to the retracted position R. The rim 190 may extend from the button 174 and may limit travel of the button 174 outside of the housing 178.

Figure 13:
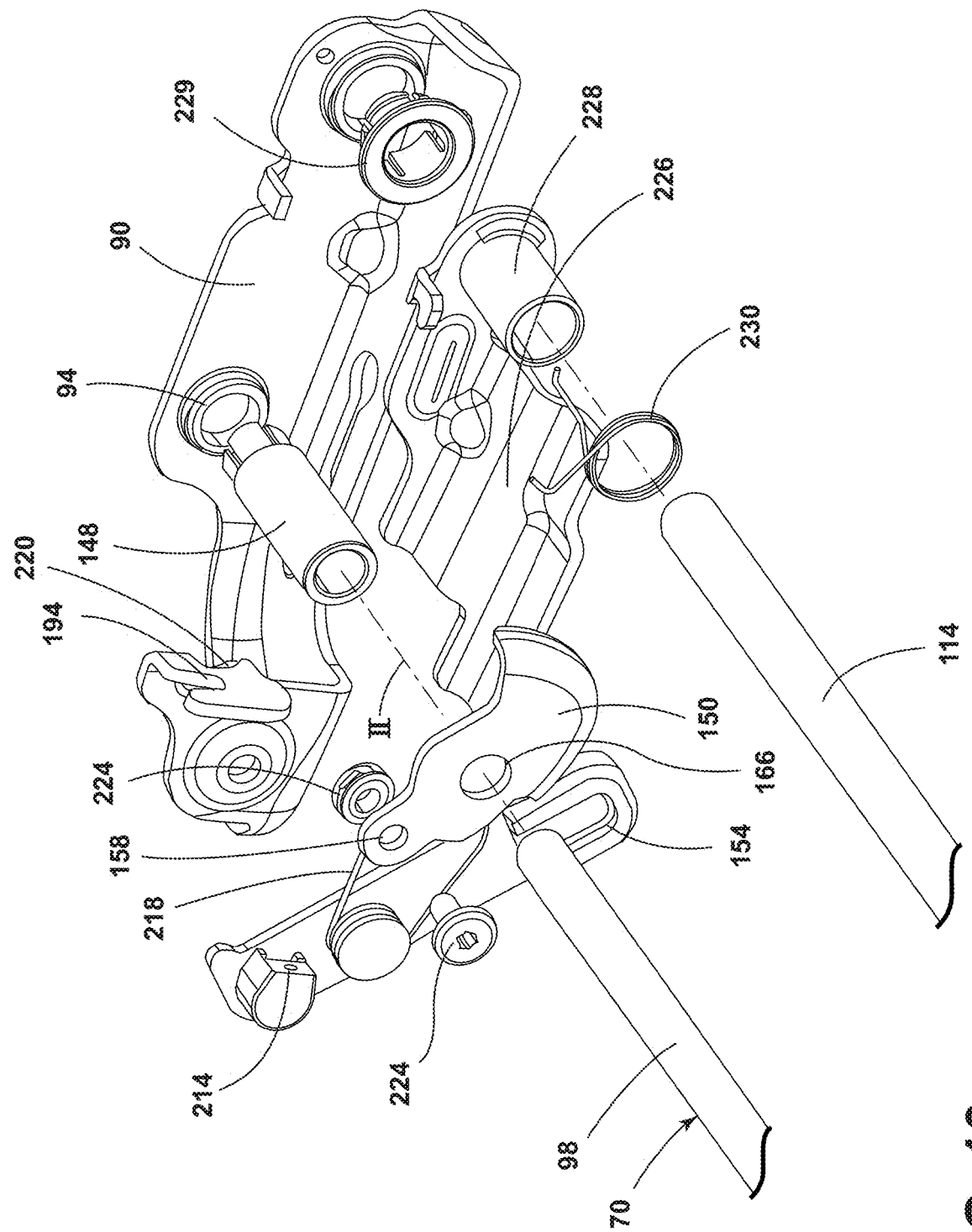
FIG. 13 is an exploded view of a cam assembly of a left side of a track module, according to an aspect of the disclosure.

Referring now to FIG. 13, an exploded view of the left track release mounting bracket 90 parts used for manual release of the track assembly 14 is shown. With reference to FIGS. 13, 18, 21, and 22, the cable assembly 198 may include a cable 202 disposed in a sheath. The sheath may include two bushings 206. Ferrules 210 may be attached to the ends of the cable 202. The left track release mounting bracket 90 may include an indentation 194 for receiving the bushing 206 of a cable assembly 198. The cable bushing 206 may surround a cable 202 that may include a ferrule 210 that may be disposed in a ferrule housing 214 on the trigger lever 154. A force (represented by arrow 302) may be exerted on the cable 202 to move the trigger lever 154 in a forward direction (arrow 310) towards the pivot bracket 42. The spring 218 may be disposed on the trigger lever 154 to return the trigger lever 154 to its locked or slanted position S after the cable 202 exerts a force in the direction shown by arrow 302 on the trigger lever 154. A fastener 224 may extend through an aperture 158 in the cam 150 to secure the spring 218 to the cam 150. The fastener 224 may include a nut and a bolt. The term cam assembly may include the cam 150 disposed around the track release bar 98. The spring 218 may be disposed near the rail 62 and through an opening 220 in the track release mounting bracket 90. An auxiliary track release mounting bracket 226 may be attached to the track release mounting bracket 90. The auxiliary track release mounting bracket 226 may include bushing 228 for positioning the auxiliary track release bar 114. A spring 230 may be disposed near the auxiliary track release mounting bracket 226 and around the bushing 228. A bushing 229 may be disposed between the auxiliary track release mounting bracket 226 and the track release mounting bracket 90.

Referring now to FIGS. 14 and 15, the locking disk assembly 58 may be moved from a disengaged position K to an engaged position J to rotate the seating assembly 10 about the axis of rotation I between the sitting position A and the standing position B. Referring to FIGS. 14, 15, 19, and 45, a force 348 may be exerted on the release lever 30 by a cable assembly 198 that may be coupled to the release lever 30. A cable bracket 238 may be attached to the pivot bracket 42. The cable 202 may be housed in the bushing 206 that may be disposed in an indentation 194B in a cable bracket 238 that may be attached to the pivot bracket 42. The pivot bracket 42 may be mounted to a rail 62.

With reference to FIGS. 16-17, exploded views of the locking disk assembly 58 and parts for manually moving the seating assembly 10 between the sitting position A and the standing position B are shown. The pivot bracket 42 may include the release lever 30 extending through the pivot bracket 42. The release lever 30 may include an arm portion 242 and an extension portion 246. The arm portion 242 may be transverse to the extension portion 246. The extension portion 246 may extend along the axis of rotation I.

Figure 18:
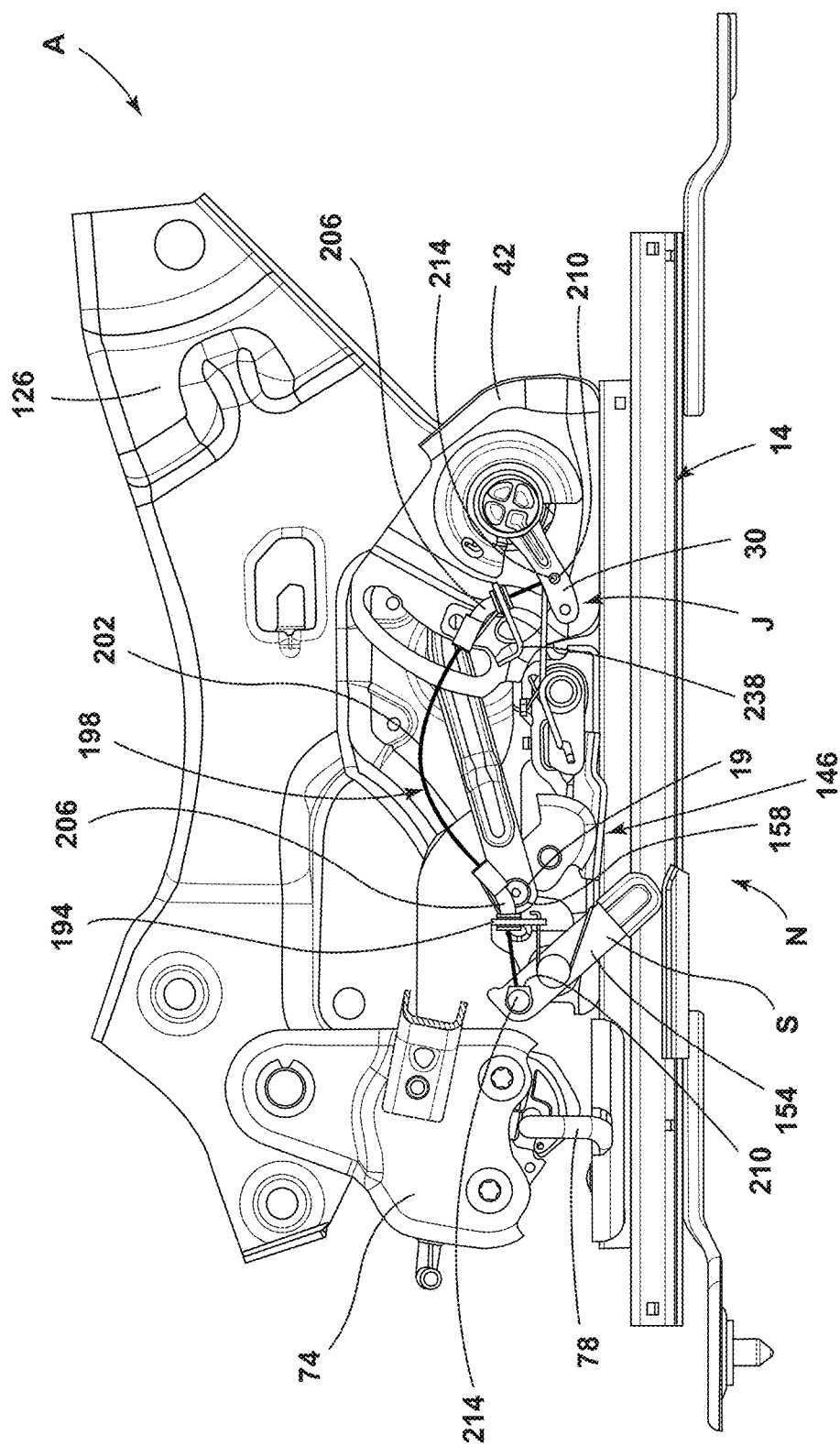
FIG. 18 is a right side elevational view of portions of a seating assembly frame in the sitting position disposed on a track assembly taken along line XVIII-XVIII of FIG. 6, according to an aspect of the disclosure.
Figure 19:
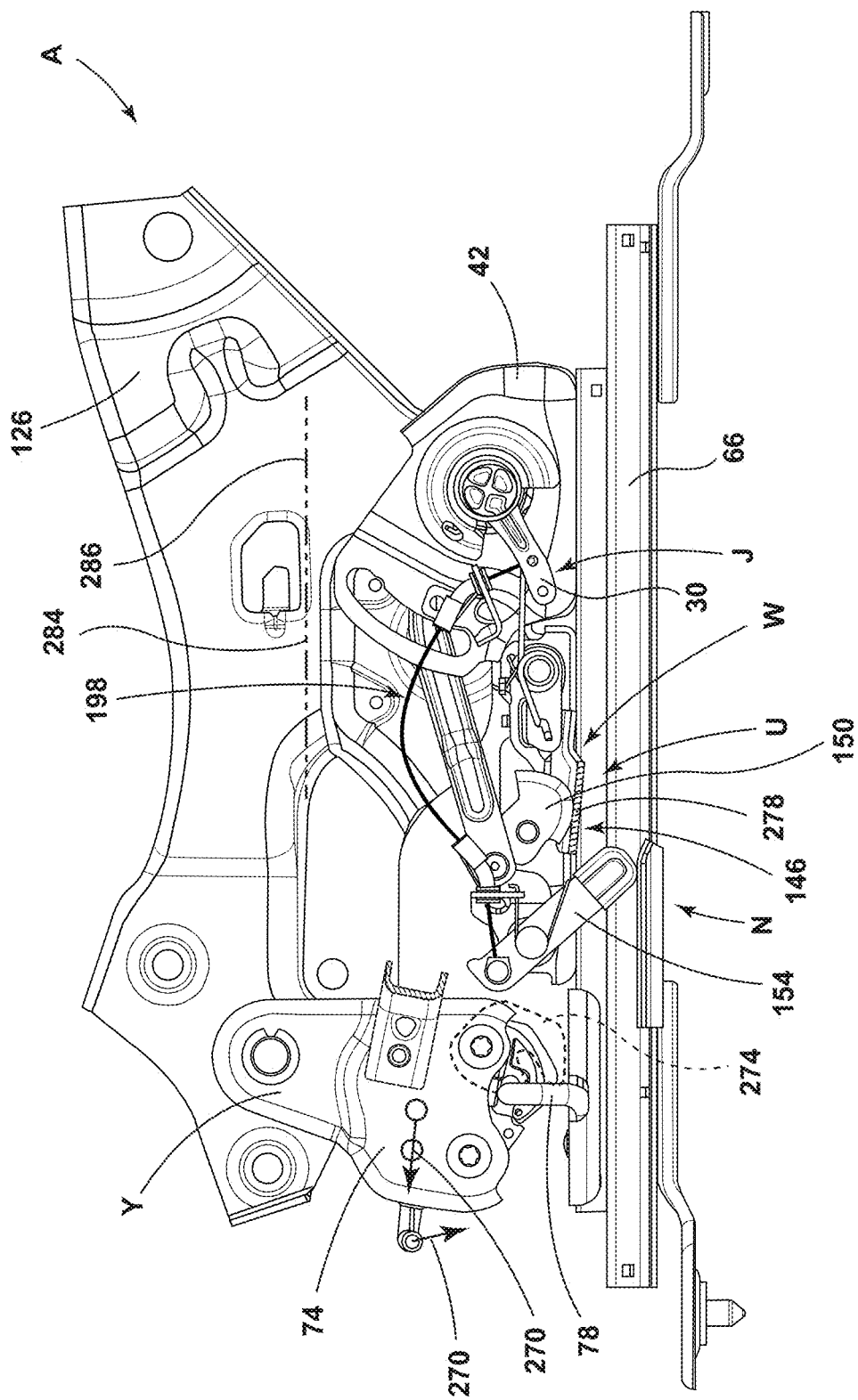
FIG. 19 is a right side elevational view of portions of a seating assembly frame in the sitting position disposed on a track assembly taken along line XVIII-XVIII of FIG. 6 showing how the latch assembly is actuated to release from the striker, according to an aspect of the disclosure.
Figure 45:
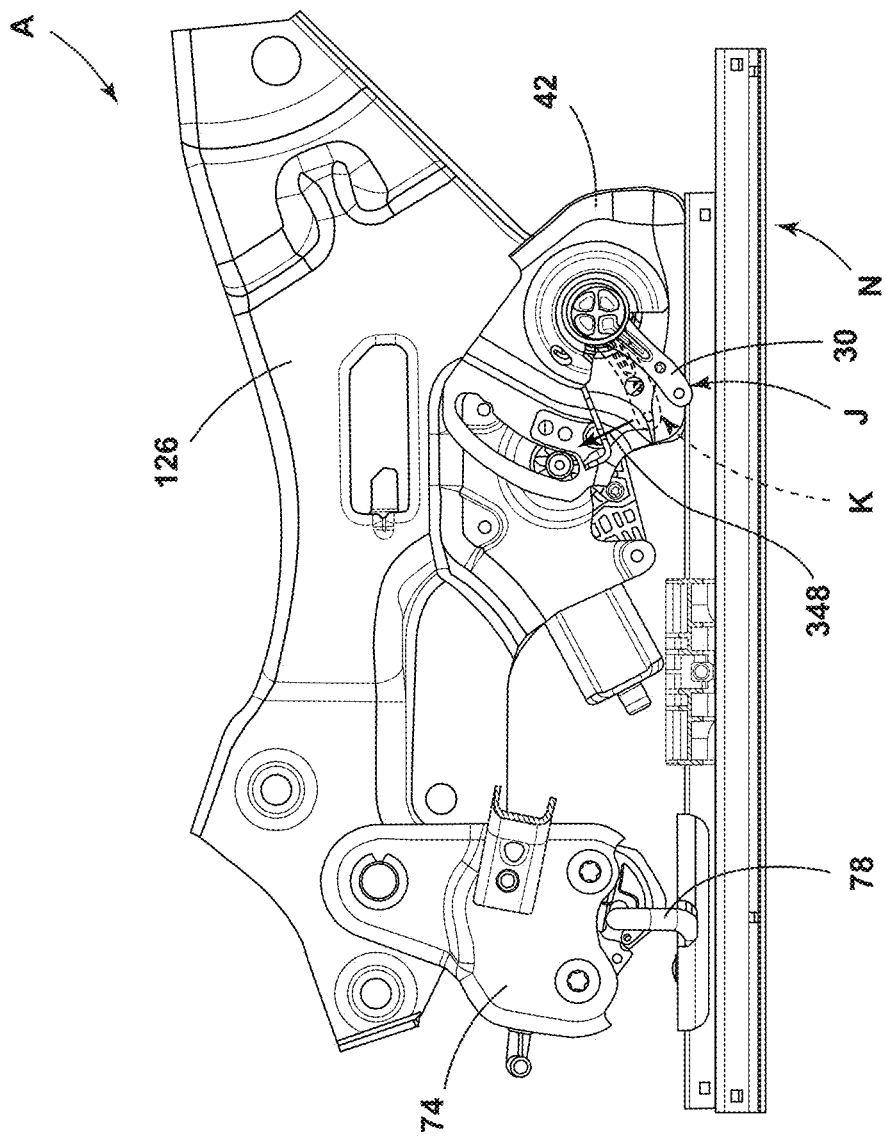
FIG. 45 is a right side elevational view of portions of the seating assembly frame and a track assembly including a representative force exerted on the locking disk lever to move the locking disk lever from the engaged position to the disengaged position, according to an aspect of the disclosure.

With continued reference to FIGS. 16-17, a cable bracket 238 may be mounted to the pivot bracket 42. Referring to FIGS. 18, 19, and 45, the cable bracket 238 may receive the bushing 206 of the cable assembly 198. Cable assembly 198 may include a cable 202 with a ferrule 210 on either end of the cable 202. When a force is exerted on the cable 202, the cable 202 may cause the release lever 30 to move from the engaged position J to the disengaged position K so that the right side bracket 122 may rotate around the pivotable coupling 18 to move the seating assembly 10 from the sitting position A toward the standing position B. When the seating assembly 10 is in the standing position B, then the release lever 30 may return to an engaged position K.

With continued reference to FIGS. 16-17, the crank assembly 162 may include the linkage 258 and the locking disk adapter bracket 254. The locking disk adapter bracket 254 may rotationally couple the linkage 258 to the pivotable coupling 18. The linkage 258 may include a bend 268 that may allow the linkage 258 to compactly fit in to the seating assembly 10. The frame attachment bushing 266 may be coupled to the left side bracket 126. The cross member adaptor bracket 262 may partially surround the release lever 30.

Referring now to FIGS. 18-23, a series of views showing manual actuation to move the seating assembly 10 from the sitting position A to the standing position B and along the track assembly 14 in the standing position B are shown. With reference to FIG. 18, the cable assembly 198 may extend from the trigger lever 154 to the release lever 30. The trigger lever 154 may include a ferrule housing 214 for receiving a ferrule 210. The release lever 30 may include a ferrule housing 214 for receiving a ferrule 210. A bushing 206 of the cable assembly 198 may be mounted in the track release mounting bracket 90. A bushing 206 of the cable assembly 198 may be mounted in the indentation 194A of the cable bracket 238 coupled to the pivot bracket 42. In various examples, a sheath may be disposed around the cable 202. The cam assembly 146 may be in the locked position U. The release lever 30 may be in the engaged position J.

Referring now to FIG. 19, the initial steps of moving the seating assembly 10 from the sitting position A to the standing position B are shown. The arrows 270 may represent a force exerted on the latch assembly 74 from an actuator. The actuator may include a pull strap 334 or latch release power actuator 350 in FIG. 30. The force (represented by arrows 270) exerted by the actuator may cause the latch arm 274 of the latch assembly 74 to rotate to disengage from the striker 78. Upon disengagement of the latch arm 274 from the striker 78, an occupant may exert a force on the seatback 12 to move the seatback 12 from a sitting position A to a standing position B. The movement of the seating assembly 10 from the sitting position A to the standing position B may occur in the directions shown by arrows 22 and 26 in FIG. 2. The cam assembly 146 may remain in the locked position U, thereby securing the rail 62 to the track 66 and maintaining the seating assembly 10 in a first position N relative to the track 66. The actuation plate 278 may be disposed over the button assembly 170 in the initial depressed position W. The release lever 30 is shown in the engaged position J.

Figure 24:
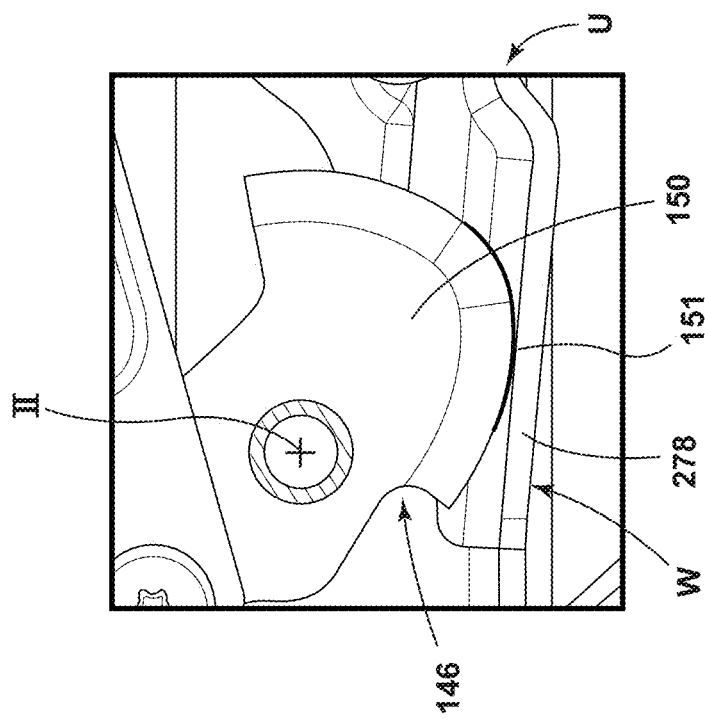
FIG. 24 is a right side elevational view of portions of a seating assembly frame taken along line XVIII-XVIII of FIG. 6 showing the cam assembly in the locked position and the actuation plate in the initial depressed position, according to an aspect of the disclosure.

With continued reference to FIG. 19 and with reference to FIG. 24, the cam 150 is shown with the eccentric profile 151 of the cam 150 in contact with the actuation plate 278. The actuation plate 278 may be in the minimally depressed position W. As such, the cam assembly 146 may be in the locked position U. In the locked position U of the cam assembly 146, the rail 62 may negligibly slide along the track 66. It follows that the seating assembly 10 may minimally move along the track 66 and may be in the first position N. Vector 284 may designate an initial angel of inclination 286 of the left side bracket 126. In the example shown, the initial angle of inclination 286 may be approximately zero degrees. Vector 284 may be disposed substantially parallel to track 66.

As the cam 150 rotates about the cam axis II from the locked position U (FIG. 24) to the unlocked position V (FIG. 25) in the direction shown by arrow 282, the concentric profile 152 of the cam 150 may depress the actuation plate 278. Consequently, the button 174 in the button assembly 170 may move from the extended position Q (FIGS. 26 and 27) to the retracted position R (FIGS. 28 and 29). When the button 174 is in the retracted position R, the rail 62 may move along the track 66 to move the seating assembly 10 along the track 66.

Figure 20:
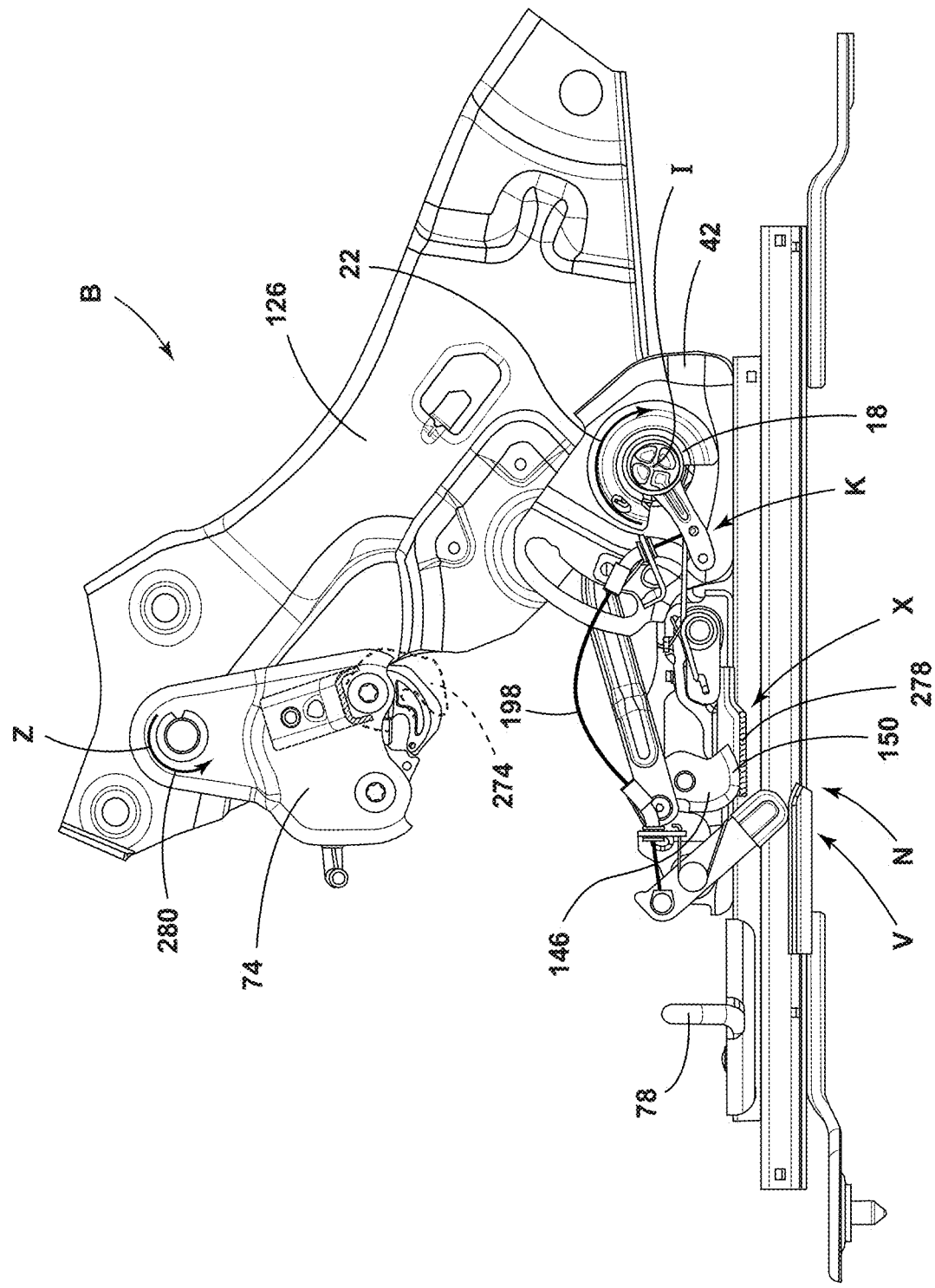
FIG. 20 is a right side elevational view of portions of a seating assembly frame disposed on a track assembly taken along line XVIII-XVIII of FIG. 6 showing the portions of the seating assembly frame in the standing position, according to an aspect of the disclosure.

With reference now to FIG. 20, the left side bracket 126 is shown rotating forward around the pivotable coupling 18 disposed at the front of the seating assembly 10 in the direction shown by arrow 22. The cam assembly 146 may have moved from the locked position U (FIG. 19) to the unlocked position V (FIG. 20). The actuation plate 278 may be in the final depressed position X.

Figure 21:
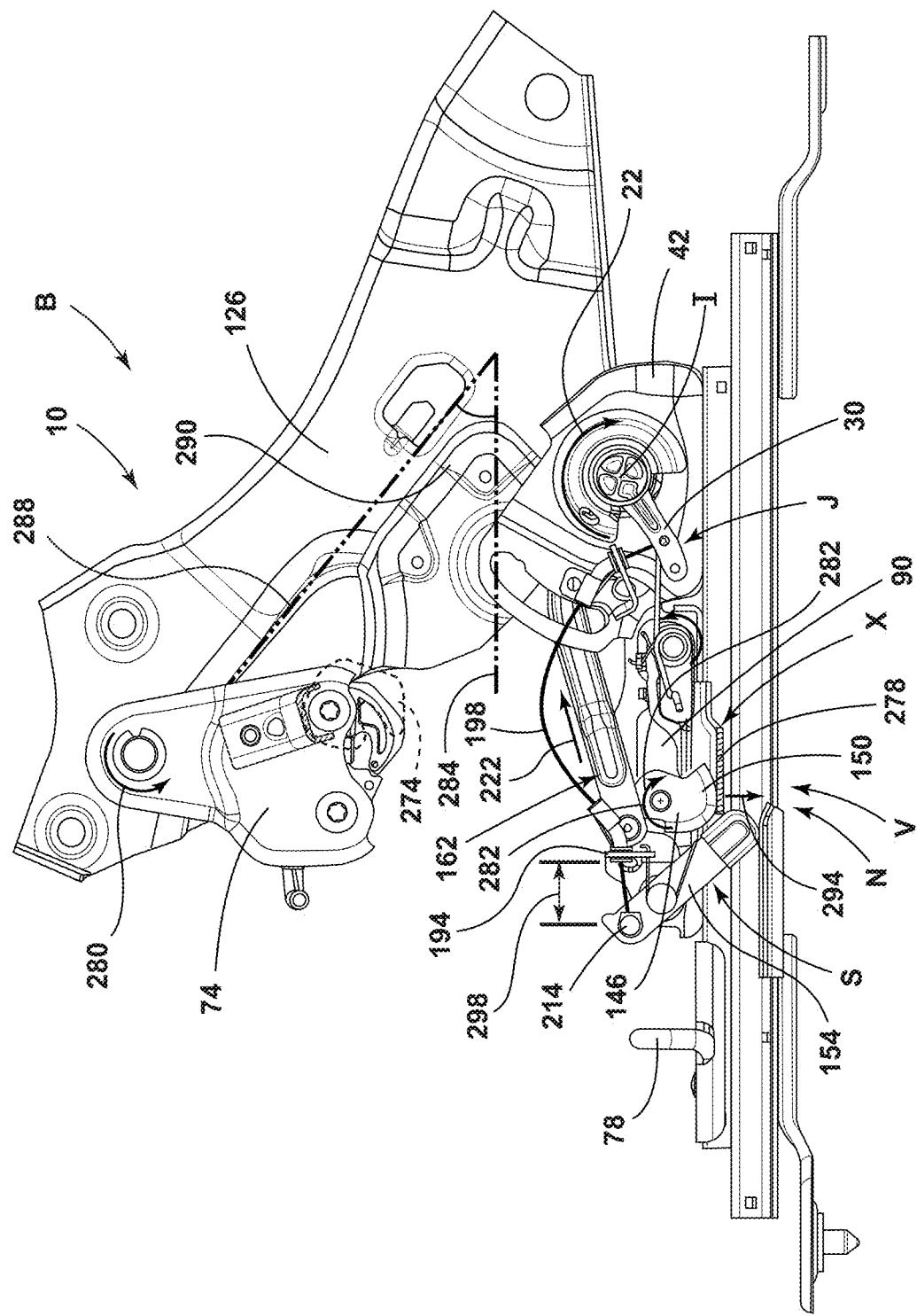
FIG. 21 is a right side elevational view of portions of the seating assembly frame disposed on a track assembly taken along line XVIII-XVIII of FIG. 6 showing the portions of the seating assembly frame in the standing position with the seating assembly at the predetermined angle of inclination and with the portions of the seating assembly frame at a first position relative to the track, according to an aspect of the disclosure.

Referring now to FIG. 21, the seating assembly 10 is in the standing position B. In the example shown, the seating assembly 10 is in the standing position B when the predetermined angle of inclination 290 of the left side bracket 126 is reached by rotating the left side bracket 126 around the axis I in the direction shown by arrow 22. The predetermined angle of inclination 290 may be defined by the distance between the vector 284 and the vector 288. The predetermined angle of inclination 290 of the left side bracket 126 may be in the range of approximately 30 degrees to approximately 50 degrees and ideally approximately 40 degrees. The cam assembly 146 may remain in the unlocked position V. When the seating assembly 10 is in the standing position B, an occupant may continue to exert a manual force on the back of the seatback 12 of the seating assembly 10 to continue to rotate the seating assembly 10 about the pivotable coupling 18 in the direction shown by arrow 22. (FIG. 2) The rotation of the left side bracket 126 around the pivotable coupling 18 in the direction of arrow 22 may cause the crank assembly 162 to move forward and upwards toward the pivotable coupling 18 in the direction shown by arrow 222. The link 130 of the crank assembly 162 may be coupled to a crank assembly holes 158 in the cam 150 (see FIGS. 13-17). As such, the crank assembly 162 may exert a force on the cam assembly 146 to cause the cam assembly 146 to rotate around the cam axis II in the direction shown by arrow 282. The cam 150 may exert a downward force, represented by arrow 294, on the actuation plate 278. The cam 150 is shown in the unlocked position V. A distance 298 may extend between the ferrule housing 214 of the trigger lever 154 and the indentation 194 on the track release mounting bracket 90. The release lever 30 is shown in the engaged position J.

Figure 22:
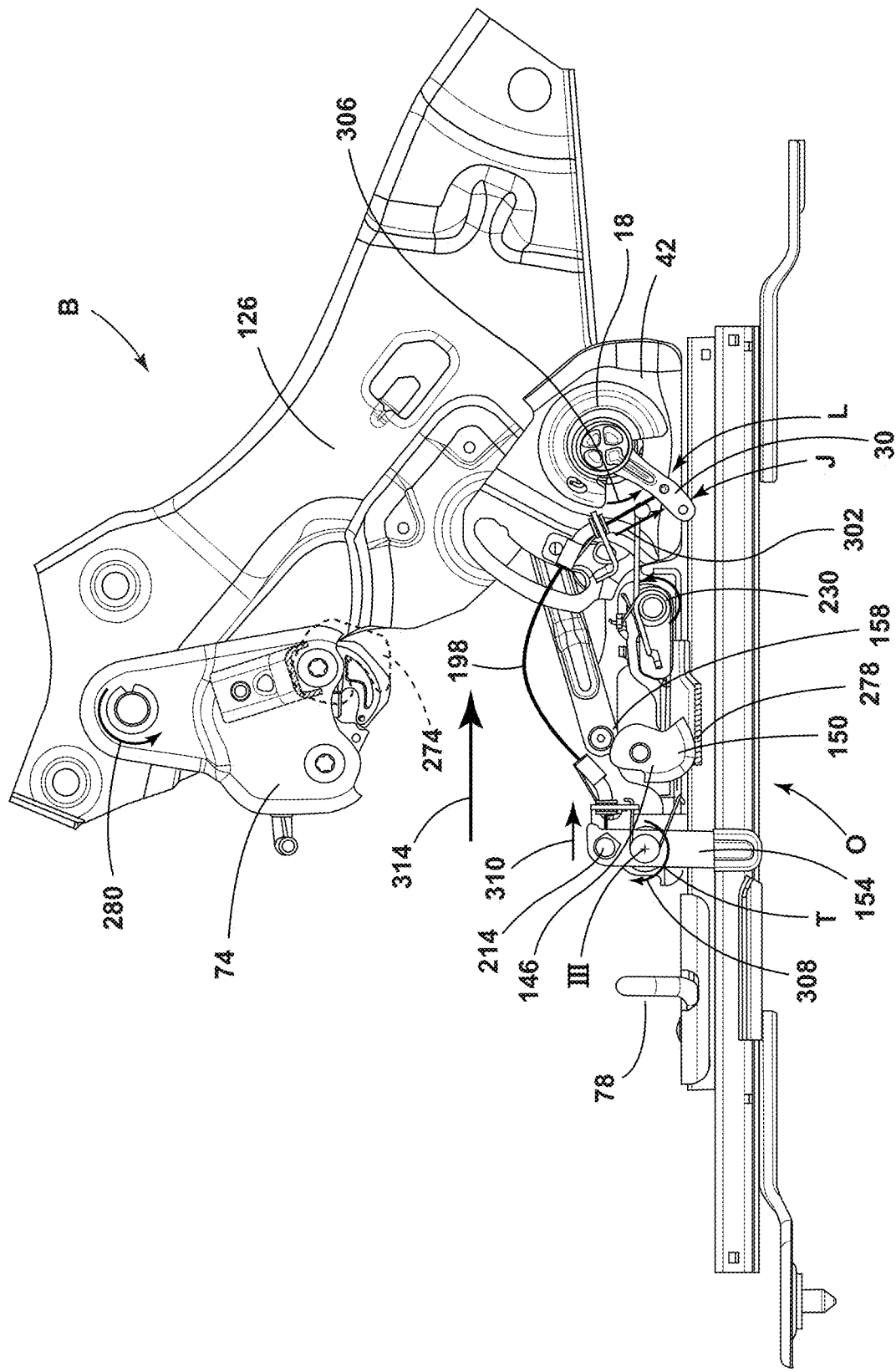
FIG. 22 is a right side elevational view of portions of a seating assembly frame disposed on a track assembly taken along line XVIII-XVIII of FIG. 6 showing the portions of the seating assembly frame in the standing position and moved between a first position and a second position, according to an aspect of the disclosure.

Referring now to FIG. 22, upon reaching the predetermined angle of inclination 290, the disk lock release lever 30 may move in the direction of arrow 302 due to movement of the trigger lever 154 from the slanted position S (FIG. 21) to the substantially vertical position T (FIG. 22). In various examples, when the left side bracket 126 is at an initial angle of inclination 286 (FIG. 19) defined by the seating assembly 10 in the sitting position A and when the left side bracket 126 is at the predetermined angle of inclination 290 (FIG. 21) defined by the seating assembly 10 in the standing position B, the release lever 30 may be in the engaged position J. When the left side bracket 126 is between the initial angle of inclination 286 and the predetermined angle of inclination 290, then the release lever 30 may be in the disengaged position K.

Thus, in the example shown in FIG. 22, the seating assembly 10 may be generally rotationally locked about the pivotable coupling 18. As the release lever 30 rotates about the axis of rotation I in the direction shown by arrow 306, the cable assembly 198 may pay towards the spring loaded release lever 30 in the direction shown by arrow 302, thereby rotating the trigger lever 154 about the trigger lever axis III in the direction shown by arrow 308 and pulling the trigger lever ferrule housing 214 toward the front pivotable coupling 18 in the direction shown by arrow 310. Thus, the seating assembly 10 may slide on the rail 62 in the track 66 from first position N (FIG. 21) to the second position O (FIG. 22) in the direction shown by arrow 314.

Figure 23:
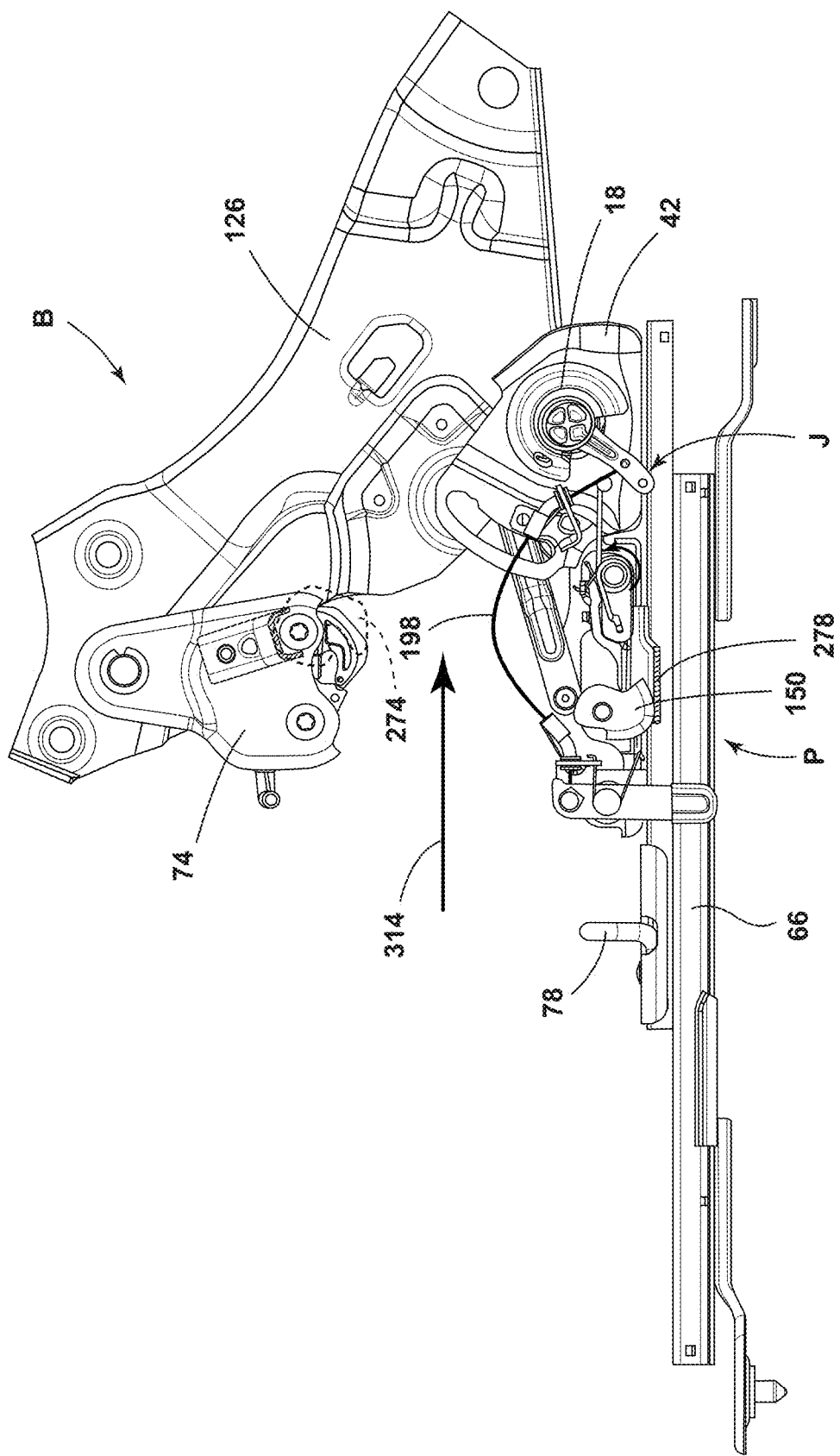
FIG. 23 is a right side elevational view of portions of a seating assembly frame disposed on a track assembly taken along line XVIII-XVIII of FIG. 6 showing the portions of the seating assembly frame in the standing position and at a third position at the front of the track assembly, according to an aspect of the disclosure.

Referring now to FIG. 23, the seating assembly 10 is shown moved manually along the tracks 66 from the second position O (FIG. 22) to the third position P (FIG. 23) in the direction shown by arrow 314. The seating assembly 10 may be generally rotationally locked about the pivotable coupling 18 as it moves from the second position O to the third position P along the tracks 66. As such, FIGS. 18-23 have shown the manual actuation to move the seating assembly 10 from the sitting position A to the standing position B and along the track 66 in the standing position B.

Figure 25:
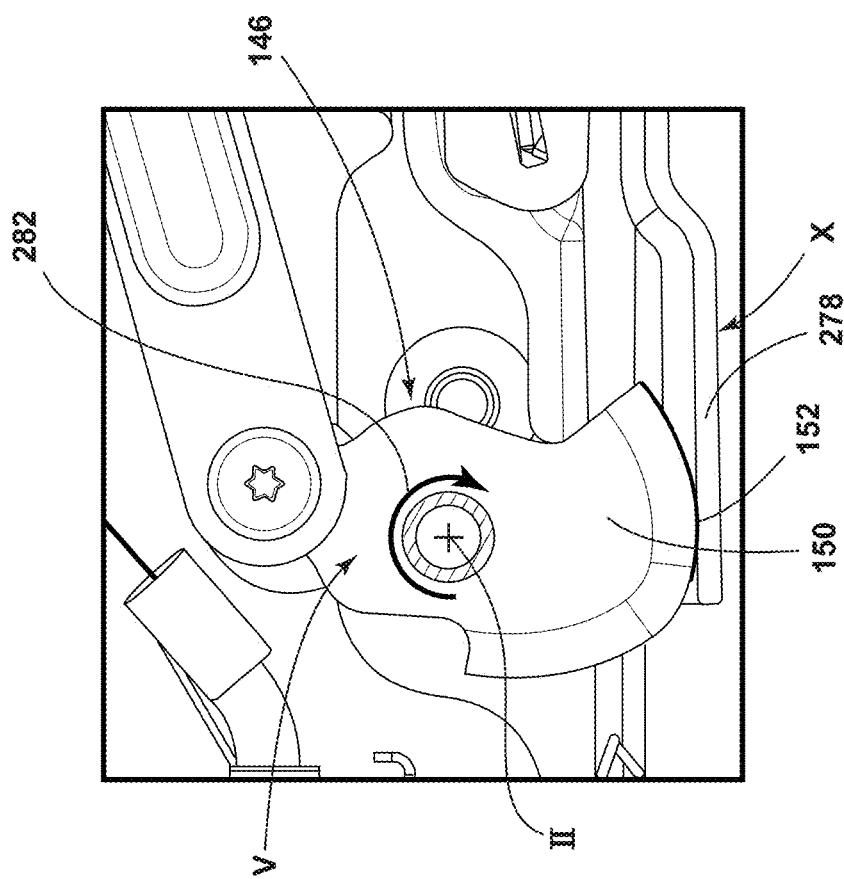
FIG. 25 is a right side perspective view of portions of a seating assembly frame taken along line XVIII-XVIII of FIG. 6 showing the cam assembly in the unlocked position and the actuation plate in the final depressed position, according to an aspect of the disclosure.

Referring now to FIGS. 24 and 25 the cam 150 may be in the locked position U (FIG. 24) or the unlocked position V (FIG. 25). In the locked position U, the eccentric profile 151 of the cam 150 may allow for quick displacement to depress the actuation plate 278 from the initial depressed position W (FIG. 24) to the final depressed position X (FIG. 25). In the locked position U of the cam assembly 146, the actuation plate 278 is in the initial depressed position W. As such, the button 174 of the button assembly 170 may extend upward into the rail 62 so that the rail 62 may be substantially stopped from sliding along the track 66. In the unlocked position V, the concentric profile 152 of the cam 150 may maintain the displacement of the actuation plate 278 from the initial depressed position W to the final depressed position X and may allow for the cam 150 to over travel so that the cam 150 may negligibly jam or negligibly bind the actuation plate 278 while continued rotation is applied about the cam axis II in the direction shown by arrow 282.

Figure 26:
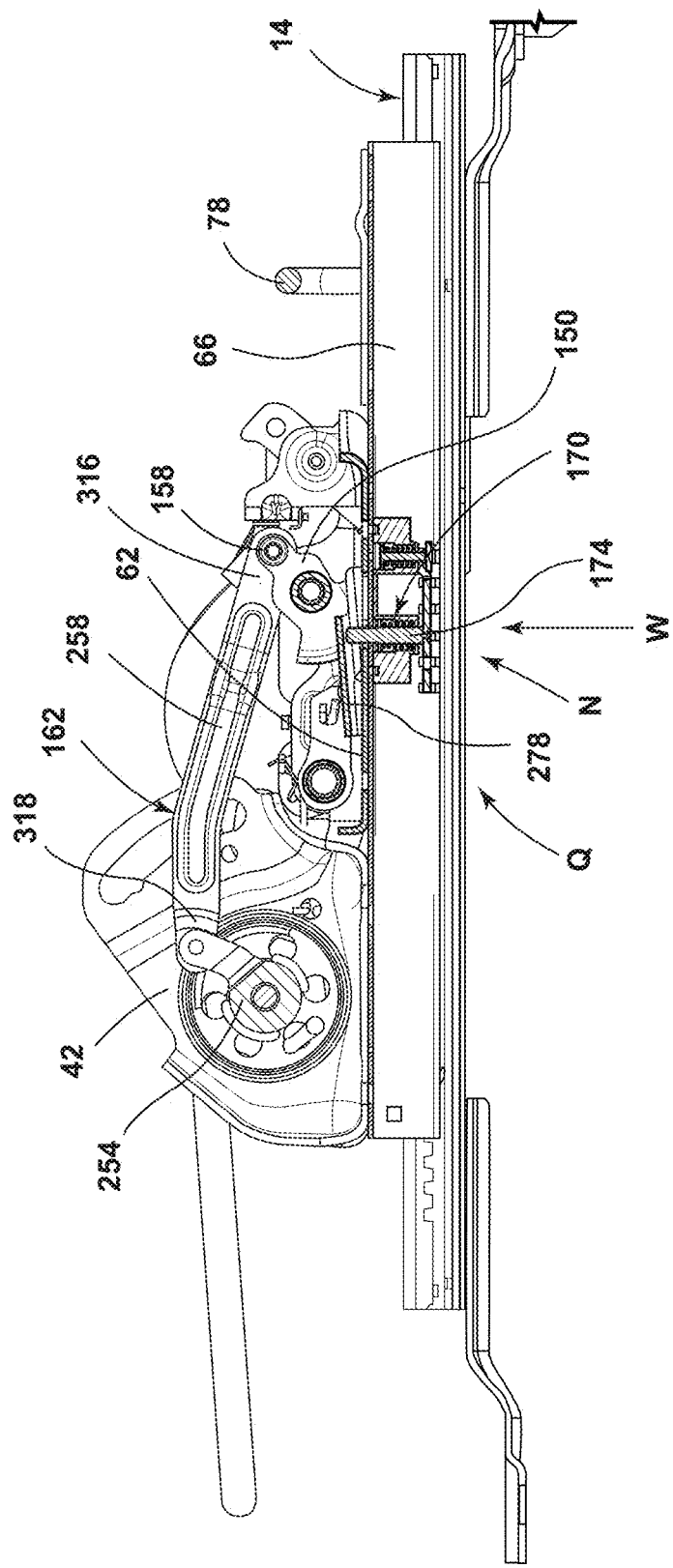
FIG. 26 is a left side elevational view of portions of a seating assembly frame in the sitting position disposed on a track assembly with the cam assembly in the locked position, the actuation plate in the initial depressed position, and the button assembly in the extended position, according to an aspect of the disclosure.
Figure 27:
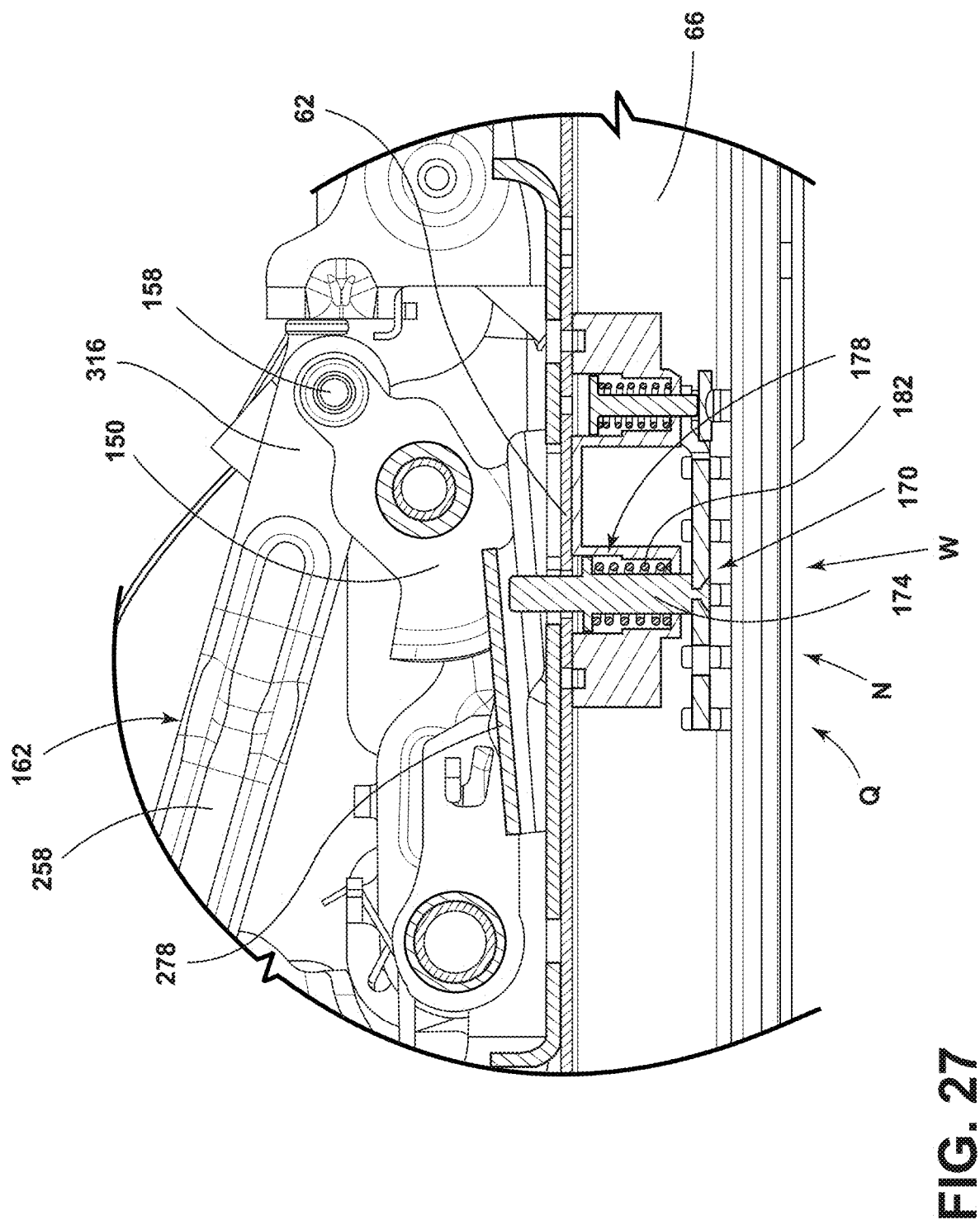
FIG. 27 is an exploded view of the cam assembly and the button assembly of FIG. 26, according to an aspect of the disclosure.
Figure 28:
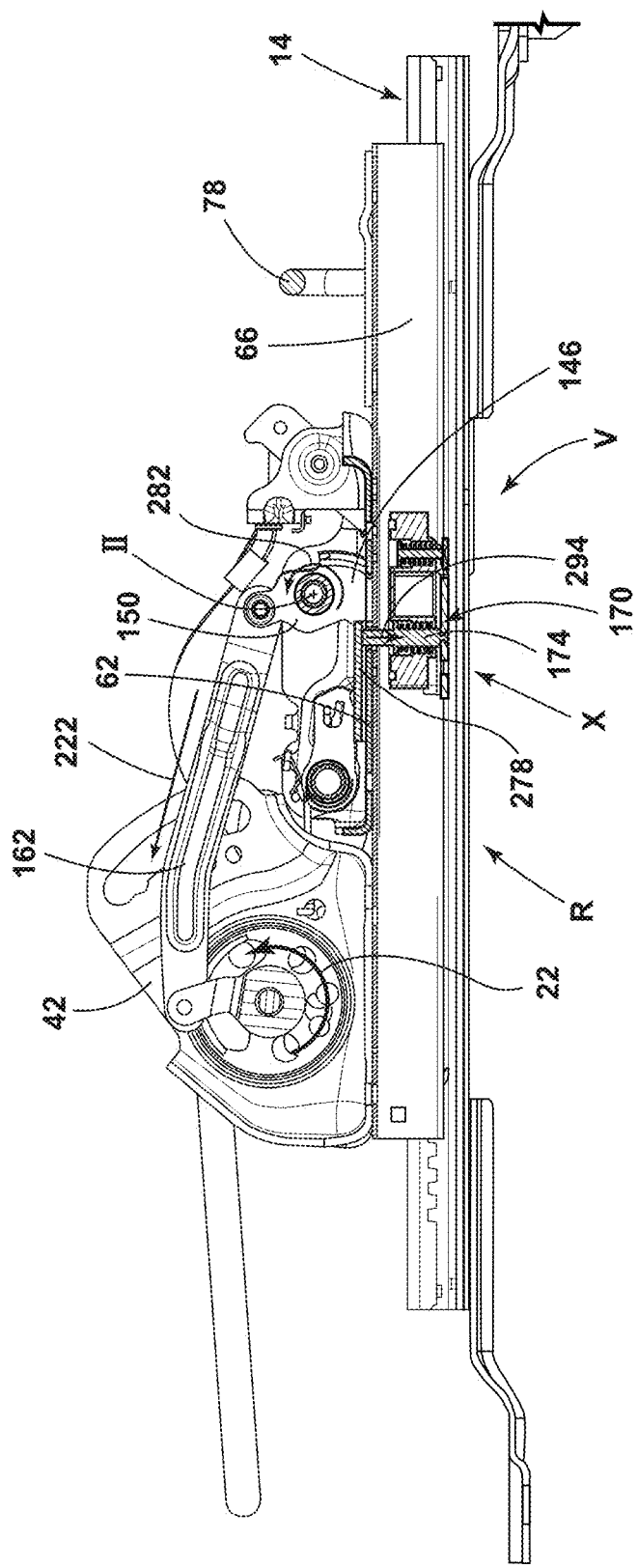
FIG. 28 is a left side elevational view of portions of a seating assembly frame in the standing position disposed on a track assembly with the cam assembly in the unlocked position, the actuation plate in the final depressed position, and the button assembly in the retracted position, according to an aspect of the disclosure.
Figure 29:
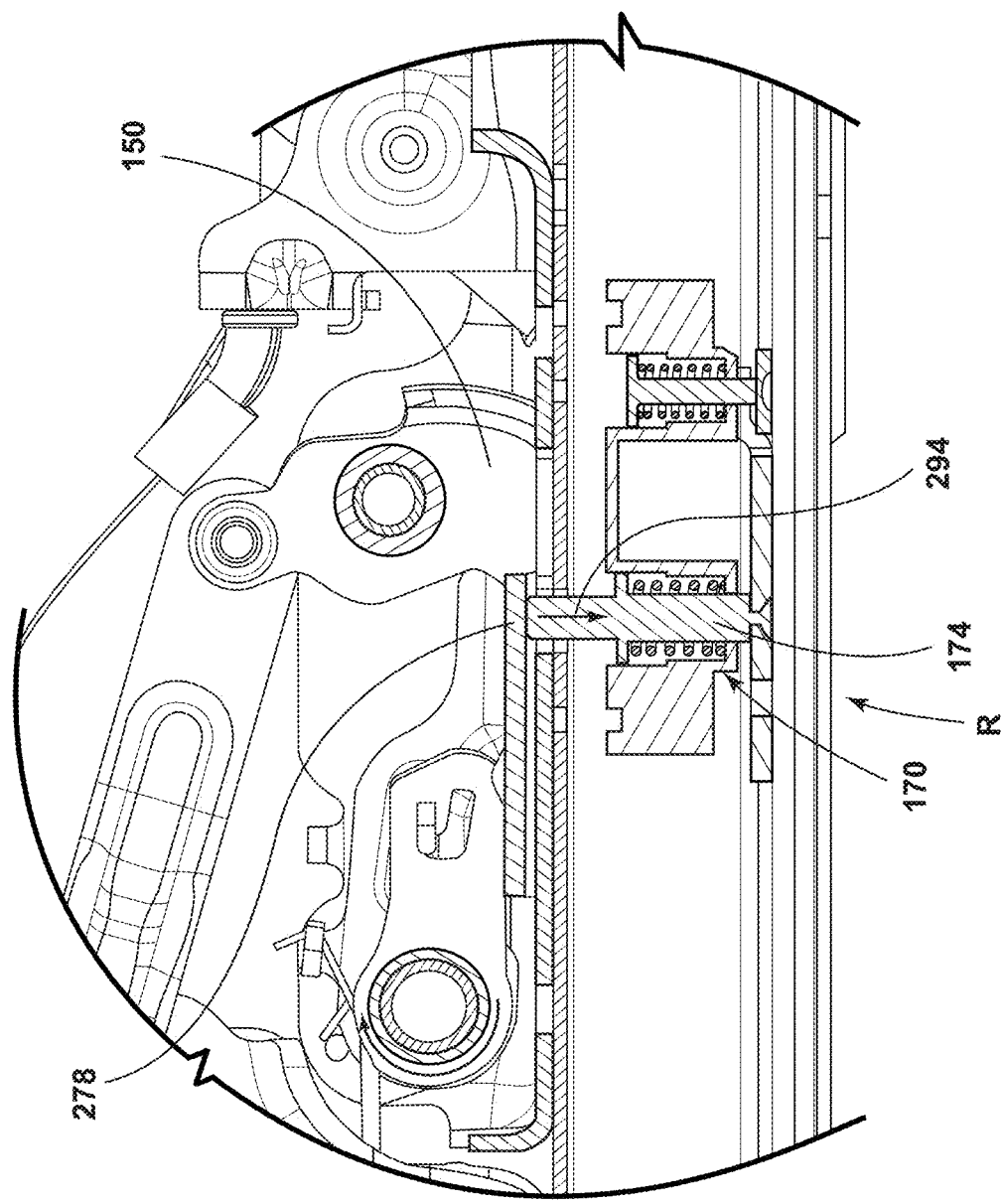
FIG. 29 is an exploded view of the cam assembly and the button assembly of FIG. 28 according to an aspect of the disclosure.

With reference to FIGS. 26-29, cross-sectional views of the button assembly 170 are shown. Referring now to FIGS. 26 and 27, the button 174 of the button assembly 170 may be in the extended position Q when the actuation plate 278 is in the initial depressed position W. The button 174 in the extended position Q may extend into the rail 62. The rail 62 may be disposed in the first position N along the track 66. The linkage 258 of the crank assembly 162 may have an end 316 coupled to the crank assembly holes 158 in the cam 150. The linkage 258 may have an end 318 coupled to the locking disk adaptor bracket 254.

Referring now to FIGS. 28 and 29, the seating assembly 10 may have the actuation plate 278 in the final depressed position X. The crank assembly 162 may have moved in the rotational direction shown by arrow 22 and the linear direction shown by arrow 222 to cause the cam 150 to rotate around the axis of rotation II of the cam 150 so that the cam assembly 146 in the unlocked position V exerts a force shown by arrow 294 on the actuation plate 278 to move the button 174 of the button assembly 170 in the direction shown by arrow 294 to the retracted or unlocked position R. When the button 174 is in the retracted or unlocked position R, then the rail 62 may slide along the track 66 to move the seating assembly 10 in the fore and aft direction along the track 66.

Figure 30:
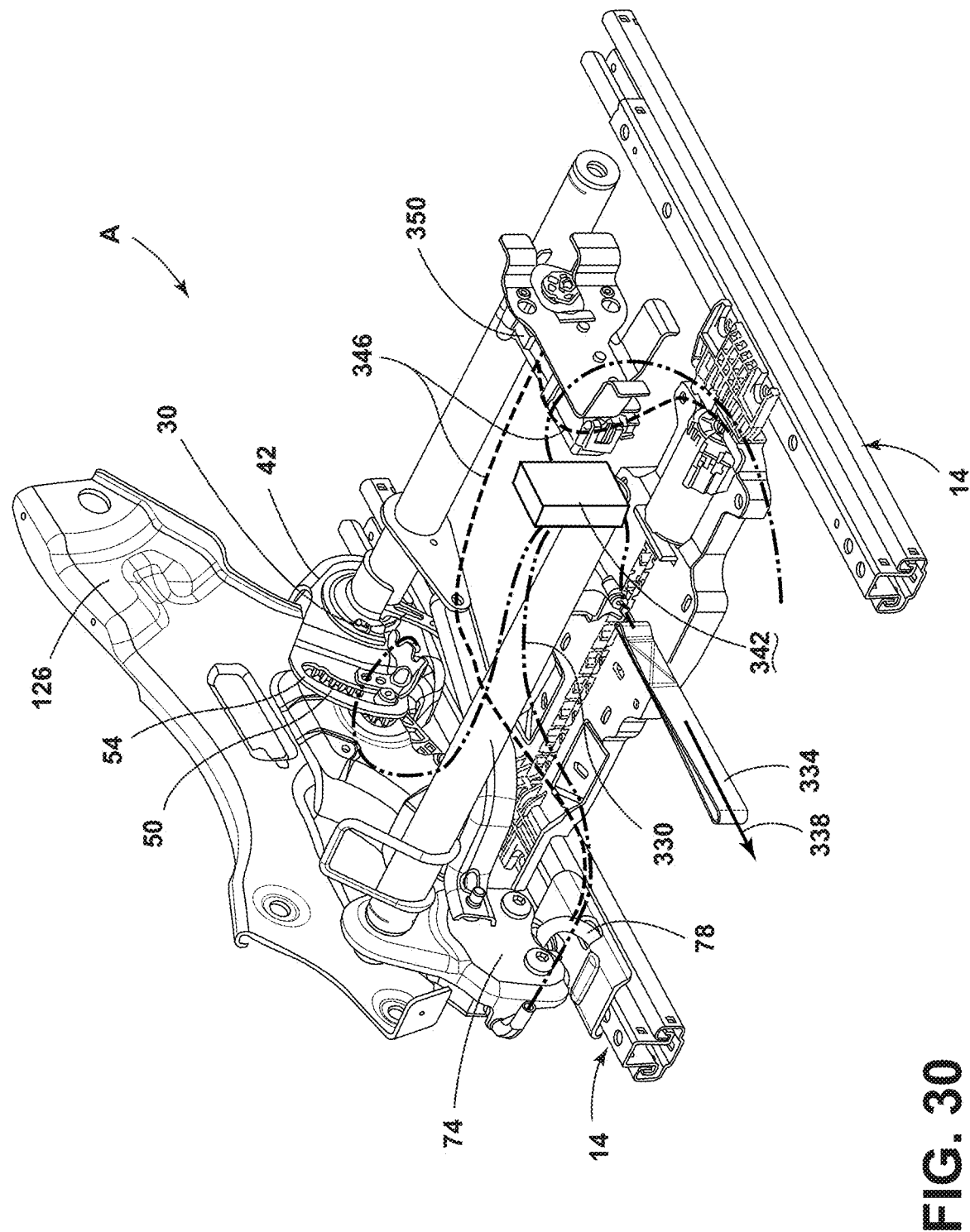
FIG. 30 is a rear perspective view of portions of the seating assembly in the sitting position showing actuation paths for moving portions of the seating assembly, according to an aspect of the disclosure.
Figure 31:
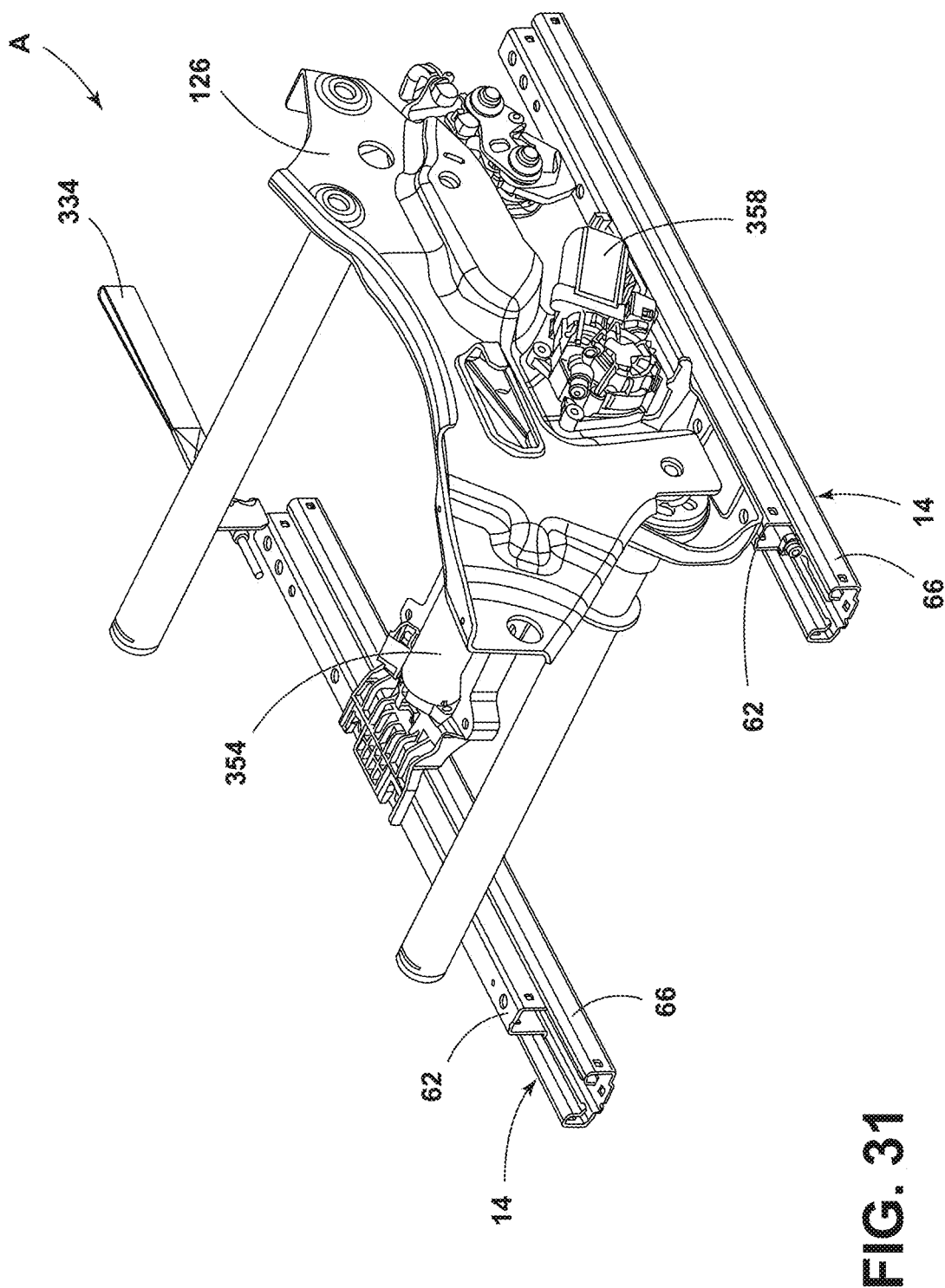
FIG. 31 is a front perspective view of portions of the seating assembly in the sitting position showing the track motor assembly and the lift motor, according to an aspect of the disclosure.

Referring now to FIGS. 30 and 31, actuators for (1) movement of the seating assembly 10 from the sitting position A to the standing position B and (2) movement of the seating assembly along the track 66 are shown. Manual and powered actuators are shown in FIG. 30. Powered actuators are shown in FIG. 31. With reference to FIG. 30, cable system 330 shows manual release of the latching assemblies 74 from the strikers 78 and manual release of the release lever Pull strap 334 may be coupled to cable system 330. A force in the direction shown by arrow 338 may be exerted on cable system 330 to release the latch assemblies 74 from the strikers 78 and to move the release lever 30 from the engaged position J to the disengaged position K so that an occupant may apply a force on the seatback 12 of a seating assembly 10 to move the seatback 12 from the sitting position A to the standing position B in the directions shown by arrows 22 and 26 in FIG. 2. Cable system 330 may include a splitter 342. Cable system 346 may be disposed between a latch release power actuator 350 and the latching assemblies 74. The latch release power actuator 350 may achieve powered release of the latch assemblies 74 from the strikers 78.

With reference to FIG. 31, the track motor assembly 354 may use powered actuation to release the rail 62 from the track 66. The powered actuation may cause the button 174 to move to the retracted position R in the button assembly 170 so that the rail 62 may move along the track 66. The lift motor or powered lift actuator 358 may rotate a pinion gear 362 along a sector bracket 54 so that the pinion gear 362 may move from a first position D to a second position E to move the seating assembly 10 from a sitting position A to a standing position B. See, FIGS. 48 and 49.

Figure 32:
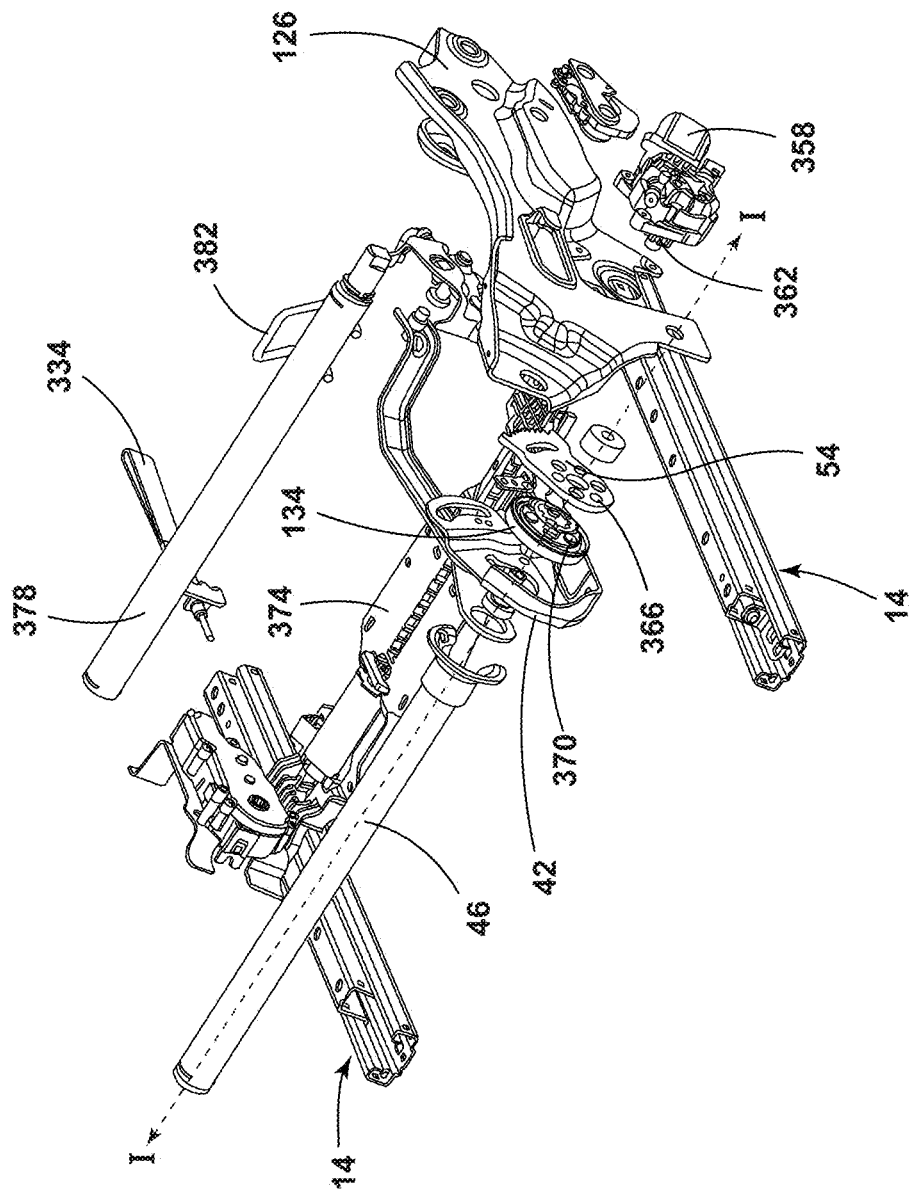
FIG. 32 is a top perspective view of portions of the seating assembly, according to an aspect of the disclosure.
Figure 33:
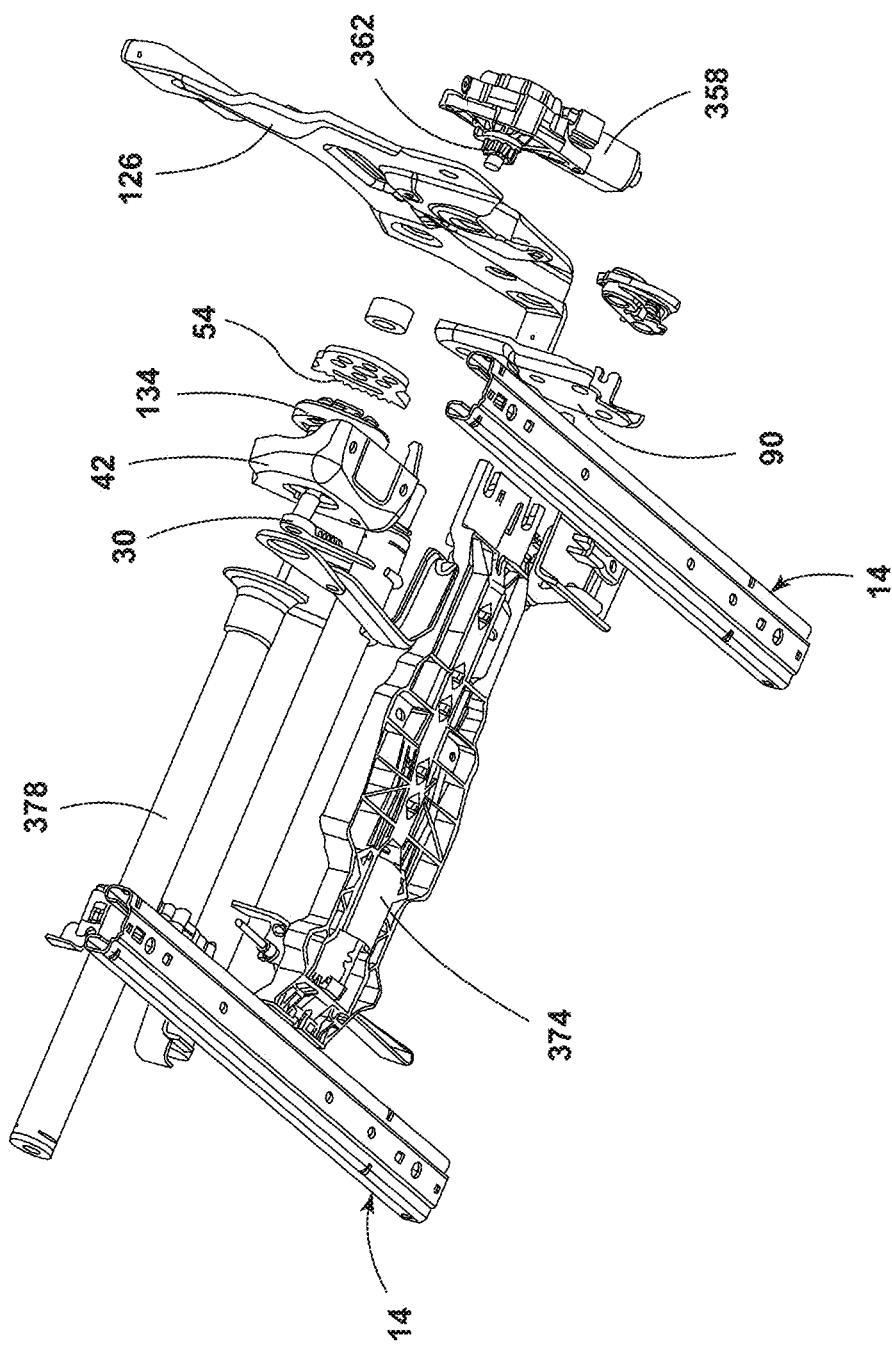
FIG. 33 is a bottom perspective view of portions of the seating assembly of FIG. 32, according to an aspect of the disclosure.

Referring now to FIGS. 32-33, powered actuation for moving the seating assembly 10 between the sitting position A and the standing position B may be achieved by the gear assembly 50. The gear assembly 50 may include a sector bracket 54 and a pinion gear 362. The powered lift actuator 358 for driving the pinion gear 362 may be coupled to the seat frame 38. The sector bracket 54 may include recesses 366 for receiving the protrusions 370 of the locking disk 134. The seating assembly 10 may be moved between the sitting position A and the standing position B with powered actuation of the pinion gear 362 to move the pinion gear 362 from the first position D to a second position E along the sector bracket 54. See, FIGS. 38-41 for gear assembly 50 in the first position D (FIGS. 38-39) and the second position E (FIGS. 40-41).

With continued reference to FIGS. 32-33, when the release lever 30 is moved to the disengaged position K, then the seating assembly 10 may be manually rotated about the axis of rotation I while the sector bracket 54 remains in a stationary position.

Referring again to FIGS. 32-33, a power strip 374 may be disposed between the two track assemblies 14. The cross member 46 may extend away from the pivot bracket 42. A connecting bar 378 may extend between the pair of latch assemblies 74. A wire member 382 may be disposed around the connecting bar 378.

Figure 35:
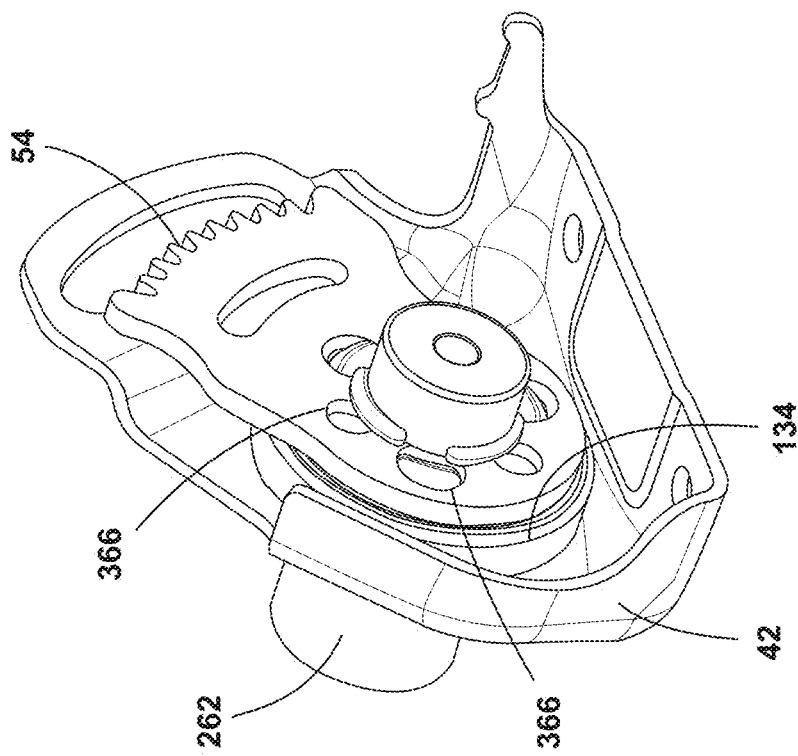
FIG. 35 is a left side perspective view of the pivot bracket of FIG. 34, according to an aspect of the disclosure.
Figure 34:
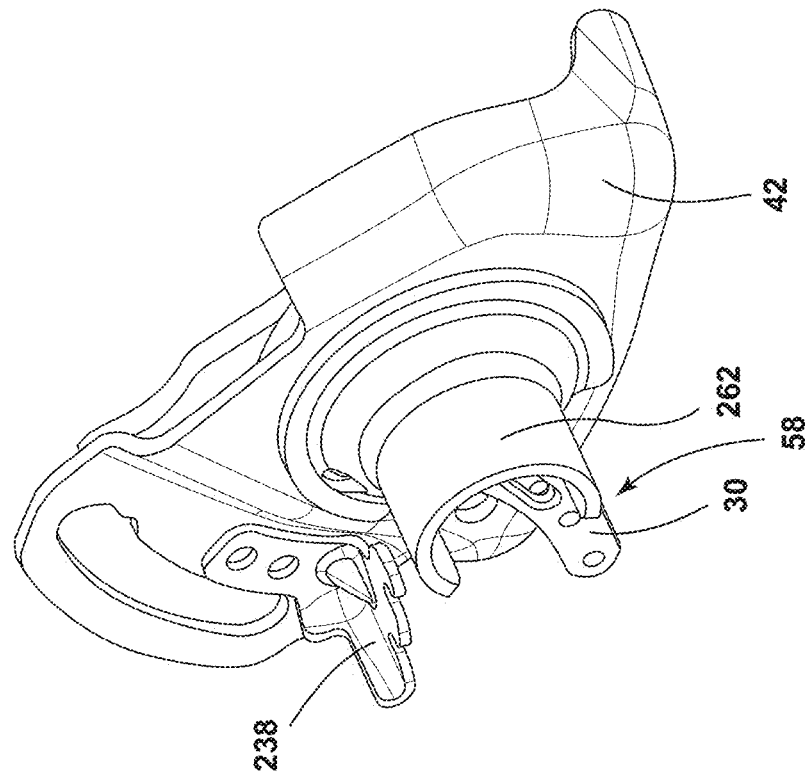
FIG. 34 is a right side perspective view of a pivot bracket, according to an aspect of the disclosure.

Referring now to FIGS. 34-35, the locking disk assembly 58 may be disposed through the pivot bracket 42. The locking disk assembly 58 may include the release lever 30, the locking disk 134, and the sector bracket 54. In some examples, the locking disk adapter bracket 254 may also be included in the locking disk assembly 58. The cable bracket 238 may be attached to the pivot bracket 42.

Referring now to FIGS. 36-37, the sector bracket 54 may be proximate the locking disk 134. A clock spring 390 may be disposed on the locking disk 134. A cross member adaptor bracket 262 may partially surround the release lever 30. The cable bracket 238 may be mounted to the pivot bracket 42. The cross tube adaptor bracket 262 may shield the release lever 30. The cross member 46 may be coupled to the cross tube adaptor bracket 262.

Referring again to FIGS. 36-37, the protrusions 370 of the locking disk 134 may form an interference fit with the recesses 366 in the sector bracket 54.

Figure 38:
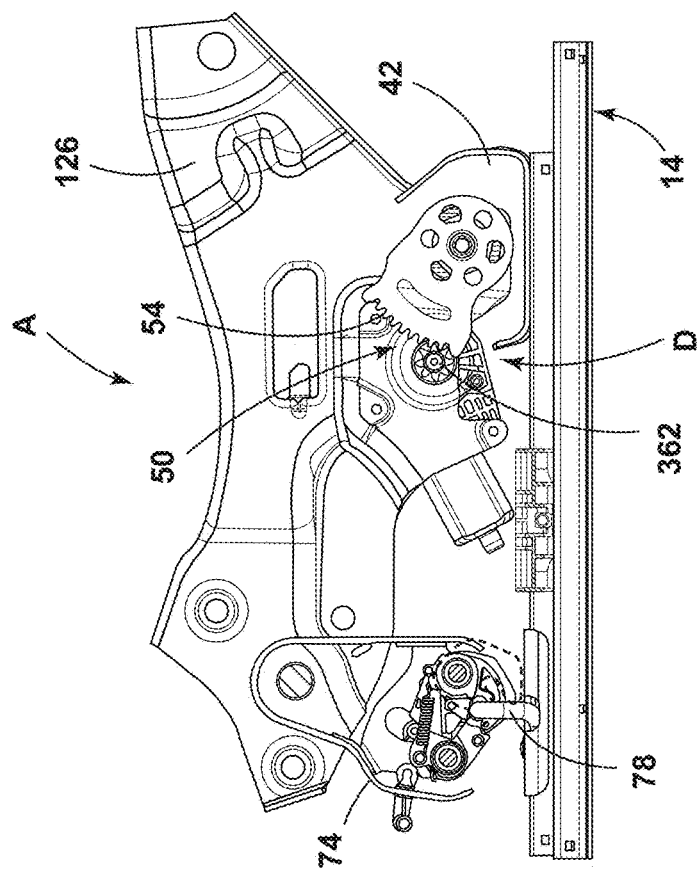
FIG. 38 is a right side elevational view of portions of a seating assembly frame in the sitting position disposed on a track assembly in a first position along the track, according to an aspect of the disclosure.
Figure 39:
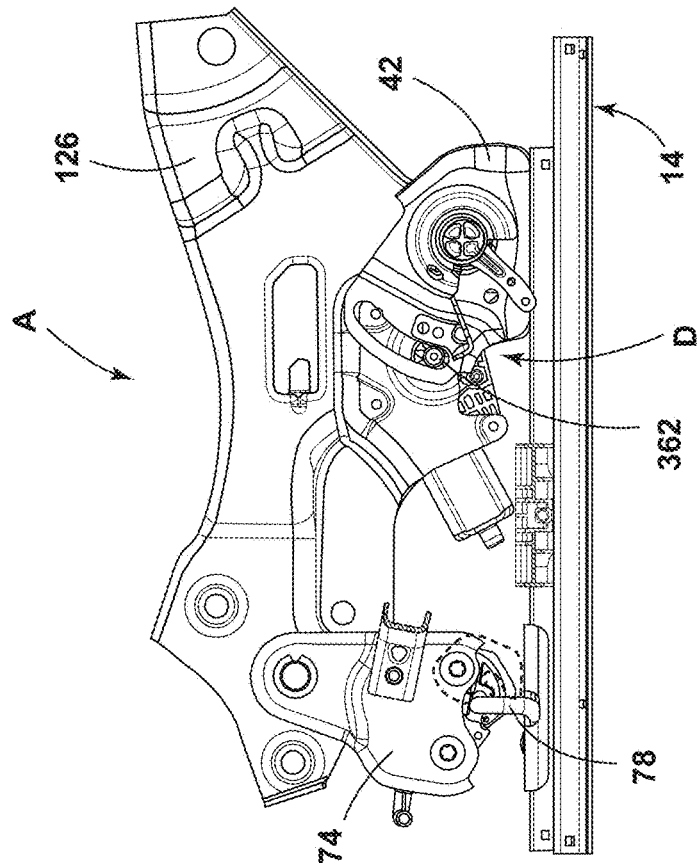
FIG. 39 is a right side elevational view of portions of a seating assembly frame of FIG. 38 in the sitting position disposed on a track assembly in a first position along the track, according to an aspect of the disclosure.
Figure 40:
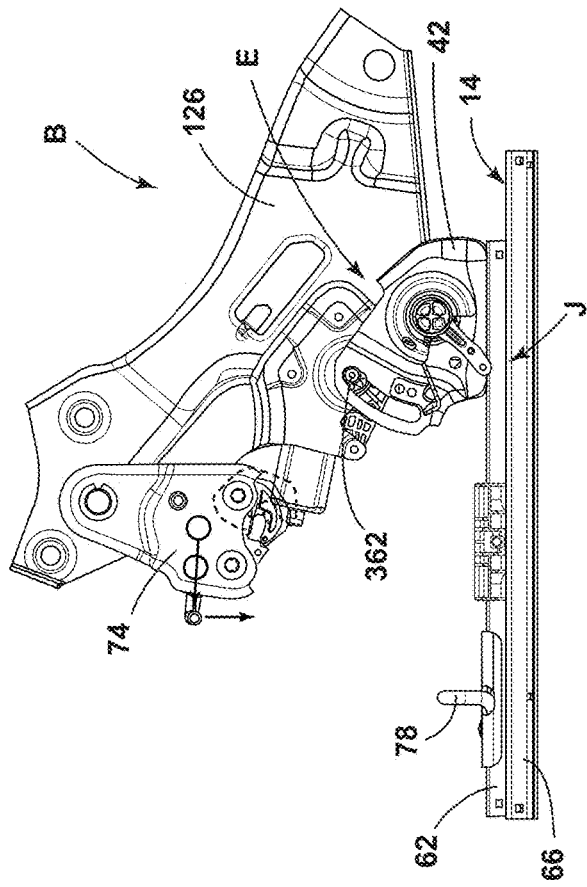
FIG. 40 is a right side elevational view of portions of a seating assembly frame of FIG. 38 in the standing position disposed on a track assembly in a first position along the track, according to an aspect of the disclosure.
Figure 41:
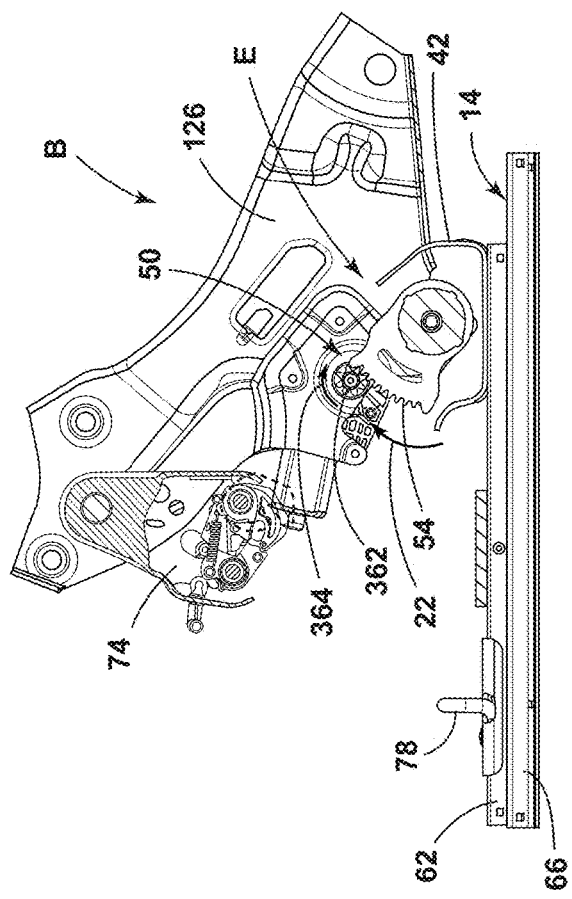
FIG. 41 is a right side elevational view of portions of a seating assembly frame of FIG. 38 in the standing position disposed on a track assembly in a first position along the track, according to an aspect of the disclosure.

With reference to FIGS. 38-41, movement of the seating assembly 10 from the sitting position A to the standing position B due to powered actuation is shown. Referring now to FIGS. 38-39, the seating assembly 10 may be in the sitting position A when powered actuation to move the seating assembly 10 from the sitting position A to the standing position B commences. The latch assembly 74 may be in the latched position. The gear assembly 50 may be disposed behind the pivot bracket 42. The pivot bracket 42 may include a guide slot for guiding the pinion gear 362. In the first position D, the pinion gear 362 may be disposed near the bottom of the sector bracket 54.

Referring now to FIGS. 40-41, as the seating assembly 10 may rotate from the sitting position A to the standing position B, the pinion gear 362 may rotate along the sector bracket 54 from a first position D at the bottom of the sector bracket 54 in the direction shown by arrow 22. When the pinion gear 362 reaches the top of the sector bracket 54, then the gear assembly 50 may be in the second position E and the seating assembly 10 may be in the standing position B. Before the pitching motion of the seating assembly 10 is energized by energizing the power actuator that powers the pinion gear 362, the latch release power actuator 350 may pull the cable 346 to release the latching assemblies 74 from the strikers 78. See, FIG. 30. The release lever may remain in an engaged position J so that the pinion gear 362 may travel or "walk up" the sector bracket 54 in the direction shown by arrow 22.

Referring now to FIGS. 42-43, the seating assembly 10 is shown moving from the first location N along the track 66 (FIG. 42) to a third location P along the track 66 (FIG. 43) in the direction shown by arrow 314. The seating assembly 10 may be disposed on the rail 62 that is slidably coupled to the track 66. The track motor assembly 354 disposed on the power bar strip 374 may move the seating assembly 10 between the first position N and the third position P. See, FIGS. 31 and 32.

With reference to FIGS. 44-47, manual actuation is shown for moving the seating assembly 10 from the sitting position A the standing position B. An occupant may exert force 338 on the pull strap 334 to release the latch assemblies 74 from the strikers 78 and to move the release lever 30 from the engaged position J to the disengaged position K. See, FIG.

30. The manual actuation may be used if a vehicle loses power or in situations where manual actuation is desired. The pull strap 334 may simultaneously move the latch assemblies 74 from the latched position to the unlatched position and move the release lever 30 from the engaged position J to the disengaged position K. Referring to FIG. 47, the manual actuation with the pull strap 334 may allow rotation about the axis of rotation I as the locking disk assembly 58 is moved from an engaged position J to a disengaged position K. The locking disk assembly 58 may move to an engaged position J after it reaches the predetermined angle of inclination 290 of the left side bracket 126. The predetermined angle of inclination 290 of the left side bracket 126 may be in the rage of approximately 30 degrees to approximately 50 degrees and ideally approximately 40 degrees from the initial angle of inclination 286 of the left side bracket 126. See, FIG. 19.

Figure 48:
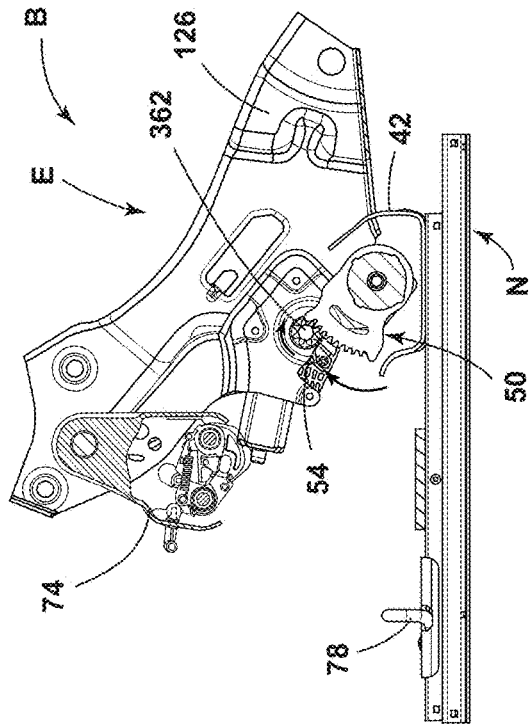
FIGS. 48-51 show a comparison of a seating assembly frames in the sitting position and the standing position and moved by powered actuation (FIGS. 48 and 49) between the sitting and standing positions and manual actuation (FIGS. 50 and 51) between the sitting and standing positions, according to an aspect of the disclosure.
Figure 49:
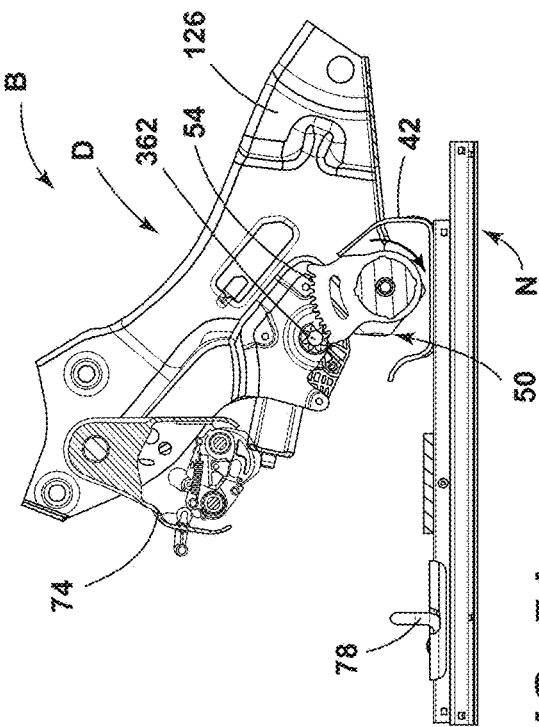

Referring to FIGS. 48-49, the movement of the seating assembly 10 due to powered actuation from the sitting position A (FIG. 48) to the standing position B (FIG. 49) is shown.

Figure 50:
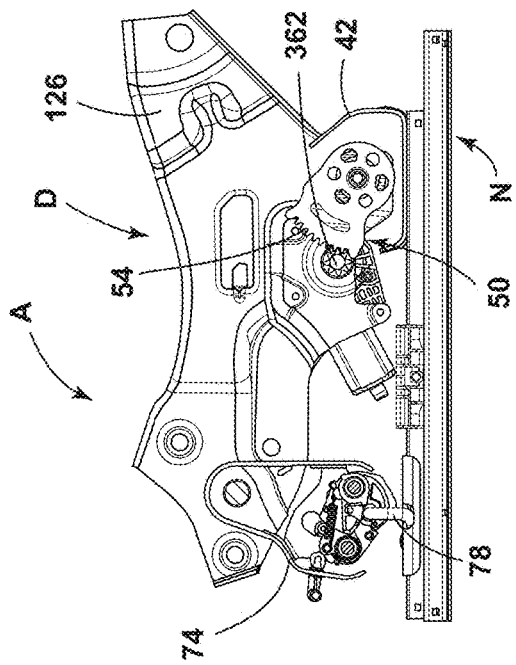
Figure 51:
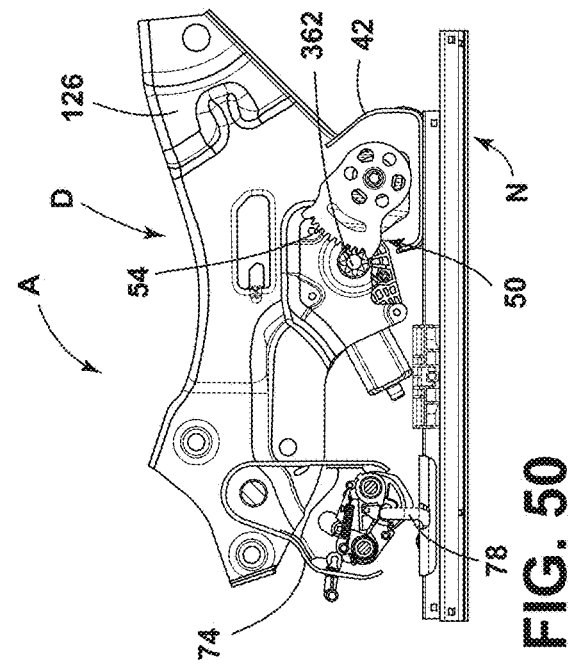

Referring to FIGS. 50-51, the movement of the seating assembly 10 due to manual actuation from the sitting position A (FIG. 50) to the standing position B (FIG. 51) is shown.

Referring to FIGS. 52-55, a connecting bar 378 may extend between a right side bracket 122 and a left side bracket 126. The connecting bar 378 may stabilize the seating assembly 10 between the left side bracket 126 and the right side bracket 122. The latch assemblies 74 may be rotatably coupled to the connecting bar 378 so that the latch assemblies 74 may swing or rotate into the seat frame 38 when the seating assembly 10 moves from a sitting position A to a standing position B. When the seating assembly 10 is in the sitting position A, then the latch assembly 74 may be in the sit position Y. See, FIG. 19. When the seating assembly is in the standing position B, then the latch assembly 74 may be in the stand position Z. See, FIG. 20. The latch assembly 74 may rotate around the connecting bar 278 in the direction shown by arrow 218 as the seating assembly 10 moves from the sitting position A to the standing position B. See, FIG. 20. It is to be understood that when the seating assembly 10 moves from the standing position B to the sitting position A, then the latch assembly 74 moves from the stand position Z to the sit position Y in a direction opposite of that shown by arrow 218. When the latch assemblies 74 rotate into the seat frame 38 when the seating assembly 10 is in the standing position B, the latch assemblies 74 may negligibly interfere with passenger and cargo ingress and egress into and out of a vehicle. The latch assemblies 74 may minimally extended into the shaded areas 34 and 40 shown in FIGS. 2 and 3, respectively, when the seating assembly 10 is in the standing position B.

With continued reference to FIGS. 52-55, the connecting bar 378 may include a tube 410 and a shaft 414. A wire member 382 for securing a child seat 384 to the seating assembly 10 may be partially disposed around the connecting bar 378. The wire member 382 may be rectangular-shaped. The wire member 382 may include a pair of opposing hooked segments 394 that may include curved ends that may be disposed around the connecting member 378. Lateral segments 398 and 402 may extend between the pair of opposing hooked segments 394 to form a rectangular shape. The lateral segment 398 may be disposed along the connecting member 378. The lateral segment 402 may extend toward the space defined by the bite line 406. The wire member 382 may include wires of various materials, diameters, and stiffnesses. In various aspects, the wire member 382 may include a metal rod. The metal rod may be bent into the shape of the wire member 382. The shaft 414 may extend through a hole 418 in the latch assembly 74, a center area 422 of a bushing 426, and an aperture 430 in a left side bracket 126. The latch assembly 74 may include a collar 428 that may extend from the latch plate 438. The tube 410 may be welded to the shaft 414 at the welds 434. The tube 410 may also be welded to the plate portion 438 of the latch assembly 74 at the welds 442. Welds 434 and 442 may be laser welds.

With continued reference to FIGS. 52-55, the end of the shaft 414 may include two D-shaped profiles 446. The two D-shaped profiles 446 may be referred to as a double D shape. The two D-shaped profiles 446 may fit within a double D-shaped aperture 430 in the left side bracket 126. An attachment device (for example, wire member 382) may be positioned around the tube 410. The wire member 382 may receive a tether from a child seat 384 disposed on the seating surface 454 of the seating assembly 10. The tether may be a strap 388 that may extend from the child seat 384. The hook may extend from the strap 388, and the hook may be attached to the wire member 382. The tether may be disposed behind the bite line 406 of a seating assembly 10. The bite line 406 of the seating assembly 10 may include the space 458 defined by the junction of a seat 11 and a seatback 12. The tether may also be disposed through other passageways that extend through the seating assembly 10 so as to be secured to the attachment device (for example, wire member 382). The tether may be fixedly attached to the rear tube 410. The latch assembly 74 may rotate around the shaft 414 as the seating assembly 10 moves between a sitting position A and a standing position B.

Figure 53:
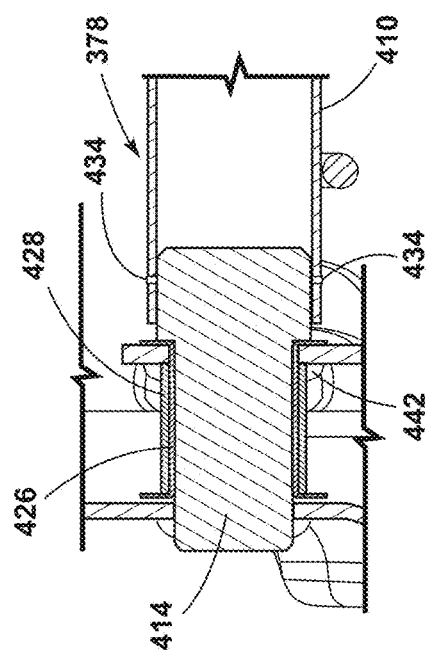
FIG. 53 is a cross-sectional view of a connecting bar taken along line LIII-LIII of FIG. 52, according to an aspect of the disclosure.

With reference to FIG. 53, a cross sectional view of the shaft 414 extending through the plate portion 438 of the latch assembly 74 and the left side bracket 126 is shown. The bushing 426 may be disposed around the shaft 414. The collar 248 may extend from the latch assembly 74. The bushing 426 may be a lubricated metal or a lubricated plastic. The bushing 426 may also be a non-lubricated metal or a non-lubricated plastic. In one example, the bushing 426 may be made of a composite material of compounded PTFE (polytetrafluoroethylene), bronze stretched metal and steel backing. The lubricated metal and the lubricated plastic may have anti-friction properties.

A variety of advantages may be obtained from the present invention. A seating assembly may be moved from a sitting position to a standing position via powered or manual actuation. Placement of the seating assembly in the standing position may increase vehicle space for occupant and cargo ingress into and egress out of the vehicle. The seating assembly may slide along the track in the standing position to provide additional space for passenger and cargo ingress into and egress out of the vehicle.

The vehicle seating assembly and the track release module for a vehicle seating assembly are also disclosed in co-pending, commonly assigned to Ford Global Technologies, LLC applications Manual and Powered Actuation of Seating Assembly, U.S. Pat. No. 11,260,776, and Mechanism for Seating Assembly Latch Assembly, U.S. Pat. No. 11,332,050, the entire disclosures of each of which are hereby incorporated herein by reference.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A track release module for a vehicle seating assembly comprising:
   a seat frame slidably coupled to a track assembly and rotatable about an axis transverse to a front of the seat frame and movable between a sitting position and a standing position; and
   a track release bar extending between opposing sides of a seat frame and rotationally coupled to a pair of cam assemblies disposed above a pair of track assemblies, wherein placement of the seating assembly in the standing position allows the seating assembly to slide along the track assembly between a first position and a second position, and wherein a movement of one of the pair of cam assemblies between a locked position and an unlocked position causes the track release bar to move the other of the pair of cam assemblies between a locked position and an unlocked position.

2. The track release module for a vehicle seating assembly of claim 1, wherein the seating assembly is selectively and alternatively movable between the sitting position and the standing position by powered actuation or manual actuation.

3. The track release module for a vehicle seating assembly of claim 1, wherein the pair of cam assemblies includes a first cam assembly coupled proximate a first end of the track release bar and a second cam assembly coupled proximate an opposite second end of the track release bar.

4. The track release module for a vehicle seating assembly of claim 1, wherein the first cam assembly includes a first cam having an eccentric profile that engages with an actuation plate to depress a button on a first track assembly to unlock the first track assembly when the first cam assembly is in the locked position in the sitting position, and wherein the first cam includes a concentric profile that rotates on the actuator plate when the first cam assembly is in the unlocked position in the standing position.

5. The track release module for a vehicle seating assembly of claim 1, wherein the second cam assembly includes a second cam having an eccentric profile that engages with an actuation plate to depress a button on a second track assembly to unlock the second track assembly when the second cam assembly is in the locked position in the sitting position, and wherein the second cam includes a concentric profile that rotates on the actuator plate when the second cam assembly is in the unlocked position in the standing position.

6. A track release module for a vehicle seating assembly comprising:
   a seat frame slidably coupled to a track assembly and rotatable about an axis transverse to a front of the seat frame and movable between a sitting position and a standing position; and
   a track release bar extending between opposing sides of a seat frame and rotationally coupled to a pair of cam assemblies disposed above a pair of track assemblies, wherein placement of the seating assembly in the standing position allows the seating assembly to slide along the track assembly between a first position and a second position, and wherein a movement of one of the pair of cam assemblies between a locked position and an unlocked position causes the track release bar to move the other of the pair of cam assemblies between a locked position and an unlocked position;
   wherein the pair of cam assemblies includes a first cam assembly coupled proximate a first end of the track release bar and a second cam assembly coupled proximate an opposite second end of the track release bar;
   wherein the first cam assembly includes a first cam having an eccentric profile that engages with an actuation plate to depress a button on a first track assembly to unlock the first track assembly when the first cam assembly is in the locked position in the sitting position, and wherein the first cam includes a concentric profile that rotates on the actuator plate when the first cam assembly is in the unlocked position in the standing position; and
   wherein the second cam assembly includes a second cam having an eccentric profile that engages with an actuation plate to depress a button on a second track assembly to unlock the second track assembly when the second cam assembly is in the locked position in the sitting position, and wherein the second cam includes a concentric profile that rotates on the actuator plate when the second cam assembly is in the unlocked position in the standing position.

7. The track release module for a vehicle seating assembly of claim 6, wherein the seating assembly is selectively and alternatively movable between the sitting position and the standing position by powered actuation or manual actuation.

* * * * *